(12) United States Patent
Wang

(10) Patent No.: US 12,096,009 B2
(45) Date of Patent: Sep. 17, 2024

(54) SIGNALING CONSTRAINTS IN NON-SCALABLE NESTED VIDEO SYNTAX ELEMENTS

(71) Applicant: Bytedance Inc., Los Angeles, CA (US)

(72) Inventor: Ye-kui Wang, San Diego, CA (US)

(73) Assignee: BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 18/077,866

(22) Filed: Dec. 8, 2022

(65) Prior Publication Data

US 2023/0095551 A1    Mar. 30, 2023

Related U.S. Application Data

(63) Continuation of application No. PCT/US2021/036489, filed on Jun. 8, 2021.

(Continued)

(51) Int. Cl.
*H04N 19/184* (2014.01)
*H04N 19/136* (2014.01)
(Continued)

(52) U.S. Cl.
CPC ......... *H04N 19/184* (2014.11); *H04N 19/136* (2014.11); *H04N 19/188* (2014.11);
(Continued)

(58) Field of Classification Search
CPC ...... H04N 19/46; H04N 19/70; H04N 19/188; H04N 19/184; H04N 19/433; H04N 19/136; H04N 19/30
See application file for complete search history.

(56) References Cited

U.S. PATENT DOCUMENTS

| 6,324,415 B1 | 11/2001 | Spehr |
| 9,395,142 B2 | 7/2016 | Rodich |

(Continued)

FOREIGN PATENT DOCUMENTS

| CA | 2951522 C | 8/2019 |
| JP | 6162236 B2 | 7/2017 |

(Continued)

OTHER PUBLICATIONS

"Series H: Audiovisual and Multimedia Systems Infrastructure of audiovisual services—Coding of moving video High efficiency video coding," Rec. ITU-T H.265 | ISO/IEC 23008-2 (in force edition), Feb. 2018, 692 pages.

(Continued)

*Primary Examiner* — Neil R Mikeska
(74) *Attorney, Agent, or Firm* — Conley Rose, P.C.

(57) ABSTRACT

Examples of video encoding methods and apparatus and video decoding methods and apparatus are described. An example method of video processing includes performing a conversion between a video and a bitstream of the video, wherein the bitstream comprises one or more supplemental enhancement information, SEI, network abstraction layer (NAL) units according to a rule, wherein the rule specifies that, responsive to an SEI NAL unit including a non-scalable-nested SEI message of a first payload type, the SEI NAL unit is disallowed to include another SEI message of a second payload type.

6 Claims, 17 Drawing Sheets

Related U.S. Application Data

(60) Provisional application No. 63/036,808, filed on Jun. 9, 2020.

(51) Int. Cl.
*H04N 19/169* (2014.01)
*H04N 19/30* (2014.01)
*H04N 19/433* (2014.01)
*H04N 19/46* (2014.01)
*H04N 19/70* (2014.01)

(52) U.S. Cl.
CPC ........... *H04N 19/30* (2014.11); *H04N 19/433* (2014.11); *H04N 19/46* (2014.11); *H04N 19/70* (2014.11)

(56) References Cited

U.S. PATENT DOCUMENTS

| | | | |
|---|---|---|---|
| 10,645,404 | B2 | 5/2020 | Wang |
| 2010/0091837 | A1 | 4/2010 | Zhu |
| 2013/0135434 | A1 | 5/2013 | Chen |
| 2013/0290492 | A1 | 10/2013 | ElArabawy |
| 2014/0016707 | A1 | 1/2014 | Wang |
| 2014/0086341 | A1 | 3/2014 | Wang |
| 2014/0098895 | A1 | 4/2014 | Wang |
| 2014/0192149 | A1* | 7/2014 | Wang ..................... H04N 19/30 348/43 |
| 2014/0301476 | A1 | 10/2014 | Deshpande |
| 2014/0355692 | A1* | 12/2014 | Ramasubramonian ..................... H04N 19/573 375/240.26 |
| 2015/0103927 | A1 | 4/2015 | Hannuksela |
| 2015/0271498 | A1 | 9/2015 | Wang |
| 2015/0271529 | A1 | 9/2015 | Wang |
| 2015/0358640 | A1* | 12/2015 | Hendry ................... H04N 19/61 375/240.13 |
| 2016/0381385 | A1 | 12/2016 | Ugur |
| 2016/0381394 | A1 | 12/2016 | Sychev |
| 2017/0214923 | A1 | 7/2017 | He |
| 2018/0014033 | A1 | 1/2018 | Wu |
| 2019/0174144 | A1* | 6/2019 | Hannuksela ........... H04N 19/70 |
| 2019/0364279 | A1* | 11/2019 | Yasugi ................. H04N 19/157 |
| 2020/0077107 | A1 | 3/2020 | Deshpande |
| 2020/0154144 | A1 | 5/2020 | Deshpande |
| 2020/0296351 | A1* | 9/2020 | Wang ..................... H04N 19/463 |
| 2022/0377384 | A1 | 11/2022 | Wang |
| 2023/0037902 | A1 | 2/2023 | Sanchez De La Fuente |
| 2023/0043130 | A1 | 2/2023 | Sanchez De La Fuente |
| 2023/0095686 | A1 | 3/2023 | Sanchez De La Fuente |

FOREIGN PATENT DOCUMENTS

| | | | |
|---|---|---|---|
| JP | 6549288 | B2 | 7/2019 |
| JP | 2020501430 | A | 1/2020 |
| RU | 2619194 | C2 | 5/2017 |
| RU | 2646378 | C2 | 3/2018 |
| WO | 2014107396 | A1 | 7/2014 |
| WO | 2021123159 | A1 | 6/2021 |
| WO | 2021123166 | A1 | 6/2021 |
| WO | 2021201548 | A1 | 10/2021 |
| WO | WO-2021252545 | A1 * | 12/2021 |

OTHER PUBLICATIONS

Document: JVET-G1001-v1, Chen, J., et al., "Algorithm Description of Joint Exploration Test Model 7 (JEM 7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.
Document: JVET-R2001-vB, Bross, B., et al., "Versatile Video Coding (Draft 9)," Joint Video Experts Team (JVET) of ITU-T SG 16 WP 3 and ISO/IEC JTC 1/SC 29/WG 11 18th Meeting: by teleconference, Apr. 15-24, 2020, 530 pages.
Document: JVET-S0152-v5, Wang, Y., "AHG2: Editorial input of a text integration for the May 2020 HLS AHG meeting outcome," Joint Video Experts Team (JVET) of ITU-T SG 16 WP 3 and ISO/IEC JTC 1/SC 29/WG 11 19th Meeting: by teleconference, Jun. 22-Jul. 1, 2020, 5 pages.
Document: JVET-Q2002-v3, Chen, J., et al., "Algorithm description for Versatile Video Coding and Test Model 8 (VTM 8)," Joint Video Experts Team (JVET) of ITU-T SG 16 WP 3 and ISO/IEC JTC 1/SC 29/WG 11 17th Meeting: Brussels, BE, Jan. 7-17, 2020, 97 pages.
Li, X., VTM software: Retrieved from the internet: https://vcgit.hhi.fraunhofer.de/jvet/VVCSoftware_VTM.git, Mar. 3, 2023, 3 pages.
Document: JCTVC-AC1005-v2, Boyce, J., et al., "HEVC Additional Supplemental Enhancement Information (Draft 4)." Joint Collaborative Team on Video Coding (JCT-VC) of ITU-T SG 16 WP 3 and ISO/IEC JTC 1/SC 29/WG 11 29th Meeting: Macao, CN, Oct. 19-25, 2017, 45 pages.
Schierl et al., "System Layer Integration of High Efficiency Video Coding ", IEEE Transactions on Circuits and Systems for Video Technology, vol. 22, No. 12, Dec. 2012, 14 pages.
Wang, Y., et al. "The High-Level Syntax of the Versatile Video Coding (VVC) Standard" Retrieved from the Internet: URL: https://ieeexplore.ieee.org/stamp/stamp.jsp?arnumber=9395142, IEEE Transactions on Circuits and Systems for Video Technology, vol. 31, No. 10, Oct. 2021, 23 pages.
Foreign Communication From A Counterpart Application, PCT Application No. PCT/US2021/036484, International Search Report dated Sep. 1, 2021, 66 pages.
Foreign Communication From A Counterpart Application, PCT Application No. PCT/US2021/036487, International Search Report dated Sep. 1, 2021, 29 pages.
Foreign Communication From A Counterpart Application, Indian Application No. 202247071748, Indian Office Action dated Feb. 13, 2023, 6 pages.
Foreign Communication From A Counterpart Application, PCT Application No. PCT/US2021/036489, International Search Report dated Sep. 1, 2021, 61 pages.
Foreign Communication From A Counterpart Application, Indian Application No. 202247071693, Indian Office Action dated Feb. 13, 2023, 7 pages.
Foreign Communication From A Counterpart Application, PCT Application No. PCT/US2021/036491, International Search Report dated Sep. 14, 2021, 16 pages.
Foreign Communication From A Counterpart Application, Indian Application No. 202247071247, Indian Office Action dated Feb. 22, 2023, 6 pages.
Foreign Communication From A Related Counterpart Application, Indian Application No. 202247071333, Indian Office Action dated May 9, 2023, 7 pages.
Non-Final Office Action dated May 17, 2023, 14 pages, U.S. Appl. No. 18/077,886, filed Dec. 8, 2022.
Non-Final Office Action dated Apr. 10, 2023, 15 pages, U.S. Appl. No. 18/078,662, filed Dec. 9, 2022.
JVET-Q0488-v1, Wan, W., et al., "AHG9: Bounding redundant SEI messages," Broadcom; Brussels, Belgium Jan. 2020 meeting, 7 pages.
Document: JVET-P2001-vE, Bross, B., "Versatile Video Coding (Draft 7)," Joint Video Experts Team (JVET) of ITU-T SG 16 WP 3 and ISO/IEC JTC 1/SC 29/WG 11 16th Meeting: Geneva, CH, Oct. 1-11, 2019, 491 pages.
Document: JVET-P0125-v1, Wang, Y.K. "AHGS/AHG17: Miscellaneous HLS topics, "Joint Video Experts Team (JVET) of ITU-T SG 16 WP 3 and ISO/IEC JTC 1/SC 29/WG 11 16th Meeting: Geneva, CH, Oct. 1-11, 2019, 3 pages.
Document: JVET-Q0394, Sanchez, Y., et al., "AHG9: On OLS extraction and scalable nesting SEI message," Joint Video Experts Team (JVET) of ITU-T SG 16 WP 3 and ISO/IEC JTC 1/SC 29/WG 11 17th Meeting: Brussels, BE, Jan. 7-17, 2020, 6 pages.
Document: JVET-Q0397, Skupin., R., et al., "AHG12: On subpicture extraction," Joint Video Experts Team (JVET) of ITU-T SG 16 WP 3 and ISO/IEC JTC 1/SC 29/WG 11 17th Meeting: Brussels, BE, Jan. 7-17, 2020, 6 pages.

(56) References Cited

OTHER PUBLICATIONS

Document: JVET-Q2001-vB, Bross, B., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, 519 pages.
Extended European Search Report from European Patent Application No. 21821514.3 dated Oct. 18, 2023, 9 pages.
Extended European Search Report from European Patent Application No. 21821749.5 dated Oct. 9, 2023, 11 pages.
Partial Supplementary European Search Report from European Patent Application No. 21822668.6 dated Oct. 20, 2023, 14 pages.
Document: JVET-R2001-vA, Bross, B., et al., "Versatile Video Coding (Draft 9)," Joint Video Experts Team (JVET) of ITU-T SG 16 WP 3 and ISO/IEC JTC 1/SC 29/WG 11 18th Meeting: by teleconference, Apr. 15-24, 2020, 524 pages.
Document: JVET-S0157-v1, Wang, Y.K., et al., "AHG9: Hrd and related cleanups," Joint Video Experts Team (JVET) of ITU-T SG 16 WP 3 and ISO/IEC JTC 1/SC 29/WG 11 19th Meeting: by teleconference, Jun. 22-Jul. 1, 2020, 7 pages.
Document: JVET-S0178-v3, Wang, Y.K., et al., "AHG9: General SEI semantics and constraints," Joint Video Experts Team (JVET) of ITU-TSG 16 WP 3 and ISO/IEC JTC 1/SC 29/WG 11 19th Meeting: by teleconference, Jun. 22-Jul. 1, 2020, 5 pages.
Document: JVET-R0101-v1, Deshpande, S., et al., "On Alternative Timing Information Signalling," Joint Video Experts Team (JVET) of ITU-T SG 16 WP 3 and ISO/IEC JTC 1/SC 29/WG 11 18th Meeting: by teleconference, Apr. 15-24, 2020, 4 pages.
Document: JVET-P0125-v2, Wang, Y.K., et al., "AHG8/AHG17: Miscellaneous HLS topics," Joint Video Experts Team (JVET) of ITU-T SG 16 WP 3 and ISO/IEC JTC 1/SC 29/WG 11 16th Meeting: Geneva, CH, Oct. 1-11, 2019, 5 pages.
Extended European Search Report from European Application No. 21822668.6 dated Feb. 9, 2024, 14 pages.
Russian Office Action from Russian Application No. 202213232/07 dated Jun. 17, 2024, 19 pages.

\* cited by examiner

730

732

Performing a conversion between a video and a bitstream of the video, wherein the bitstream comprises one or more output layer sets comprising one or more video layers according to a format rule, wherein the format rule specifies that a particular payload type value corresponding to subpicture level information is disallowed from a list that includes allowable supplemental enhancement information (SEI) payload type values for non-hypothetical reference decoder (HRD) related supplemental enhancement information (SEI) messages.

1012 — Performing a conversion between a video and a bitstream of the video according to a rule, wherein the rule specifies that a first syntax field indicating sublayer representation information for which an initial coded picture buffer (CPB) removal delay related syntax elements are present is omitted, responsive to a particular value of a second syntax field indicative of a maximum number of temporal sublayers for which an initial CPB removal delay is indicated in a buffering period supplemental enhancement information (SEI) message.

FIG. 10B

SIGNALING CONSTRAINTS IN NON-SCALABLE NESTED VIDEO SYNTAX ELEMENTS

CROSS-REFERENCE TO RELATED APPLICATIONS

This application is a continuation of International Patent Application No. PCT/US2021/036489, filed on Jun. 8, 2021, which claims the priority to and benefits of U.S. Provisional Patent Application No. 63/036,808, filed on Jun. 9, 2020. All the aforementioned patent applications are hereby incorporated by reference in their entireties.

TECHNICAL FIELD

This patent document relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present document discloses techniques that can be used by video encoders and decoders to perform video encoding or decoding.

In one example aspect, a video processing method is disclosed. The method includes performing a conversion between a video and a bitstream of the video, wherein the bitstream includes one or more output layer sets comprising one or more video layers according to a format rule, wherein the format rule specifies that a non-scalable-nested supplemental enhancement information, SEI, message that includes information regarding hypothetical reference decoder, HRD, is applicable to all output layer sets that include same video layers as the bitstream.

In another example aspect, another video processing method is disclosed. The method includes performing a conversion between a video and a bitstream of the video, wherein the bitstream comprises one or more output layer sets comprising one or more video layers according to a format rule, wherein the format rule specifies that a non-scalable-nested hypothetical reference decoder (HRD)-related supplemental enhancement information (SEI) message is omitted responsive to a condition that there does not exist an output layer set that includes a same set of layers as the bitstream.

In another example aspect, another video processing method is disclosed. The method includes performing a conversion between a video and a bitstream of the video, wherein the bitstream comprises one or more output layer sets comprising one or more video layers according to a format rule, wherein the format rule specifies that a value of layer identifier for a supplemental enhancement information (SEI) network abstraction layer (NAL) unit that includes a non-scalable-nested SEI message is not constrained.

In another example aspect, another video processing method is disclosed. The method includes performing a conversion between a video and a bitstream of the video, wherein the bitstream comprises one or more output layer sets comprising one or more video layers according to a format rule, wherein the format rule specifies that a particular payload type value corresponding to subpicture level information is disallowed from a list that includes allowable supplemental enhancement information (SEI) payload type values for non-hypothetical reference decoder (HRD) related supplemental enhancement information (SEI) messages.

In another example aspect, another video processing method is disclosed. The method includes performing a conversion between a video and a bitstream of the video, wherein the bitstream includes one or more output layer sets comprising one or more video layers according to a format rule, wherein the format rule specifies that a non-scalable-nested supplemental enhancement information, SEI, message that includes information irrelevant to hypothetical reference decoder (HRD) is applicable to all layers in the bitstream.

In another example aspect, another video processing method is disclosed. The method includes performing a conversion between a video and a bitstream of the video comprising one or more output layer sets according to a rule, wherein the rule specifies that a supplemental enhancement information (SEI) network abstraction layer (NAL) unit that includes a scalable-nested SEI message carrying picture timing information is not included due to use of a same picture timing in all output layer sets in the bitstream.

In another example aspect, another video processing method is disclosed. The method includes performing a conversion between a video and a bitstream of the video, wherein the bitstream comprises one or more supplemental enhancement information, SEI, network abstraction layer (NAL) units according to a rule, wherein the rule specifies that, responsive to an SEI NAL unit including a non-scalable-nested SEI message of a first payload type, the SEI NAL unit is disallowed to include another SEI message of a second payload type.

In another example aspect, another video processing method is disclosed. The method includes performing a conversion between a video and a bitstream of the video according to a rule, wherein the bitstream comprises one or more supplemental enhancement information, SEI, network abstraction layer (NAL) units according to a rule, wherein the rule specifies that, responsive to an SEI NAL unit including a scalable-nested SEI message of a first payload type, the SEI NAL unit is disallowed to include another SEI message of a second payload type.

In another example aspect, another video processing method is disclosed. The method includes performing a conversion between a video and a bitstream of the video, wherein the bitstream comprises one or more supplemental enhancement information, SEI, network abstraction layer (NAL) units according to a rule, wherein the rule specifies that, responsive to an SEI NAL unit including a SEI message of a first payload type, the SEI NAL unit is disallowed to include another SEI message not equal to the first payload type or a second payload type.

In another example aspect, another video processing method is disclosed. The method includes performing a conversion between a video and a bitstream of the video, wherein the bitstream comprises one or more output layer sets comprising one or more video layers according to a rule, wherein the rule specifies a particular decoding order between a subpicture level information (SLI) supplemental enhancement information (SEI) message and a buffering period (BP) SEI message that apply to a particular output layer set, responsive to a condition that the SLI SEI message and the BP SEI message are included in an access unit.

In another example aspect, another video processing method is disclosed. The method includes performing a conversion between a video and a bitstream of the video according to a rule, wherein the rule specifies that a first syntax field indicating sublayer representation information for which an initial coded picture buffer (CPB) removal delay related syntax elements are present is omitted, responsive to a particular value of a second syntax field indicative of a maximum number of temporal sublayers for which an initial CPB removal delay is indicated in a buffering period supplemental enhancement information (SEI) message.

In yet another example aspect, a video encoder apparatus is disclosed. The video encoder comprises a processor configured to implement above-described methods.

In yet another example aspect, a video decoder apparatus is disclosed. The video decoder comprises a processor configured to implement above-described methods.

In yet another example aspect, a computer readable medium having code stored thereon is disclose. The code embodies one of the methods described herein in the form of processor-executable code.

These, and other, features are described throughout the present document.

BRIEF DESCRIPTION OF DRAWINGS

FIGS. 7A to 7E are flowcharts for example methods of video processing based on some implementations of the disclosed technology.

FIGS. 10A and 10B are flowcharts for example methods of video processing based on some implementations of the disclosed technology.

DETAILED DESCRIPTION

Figure 1:
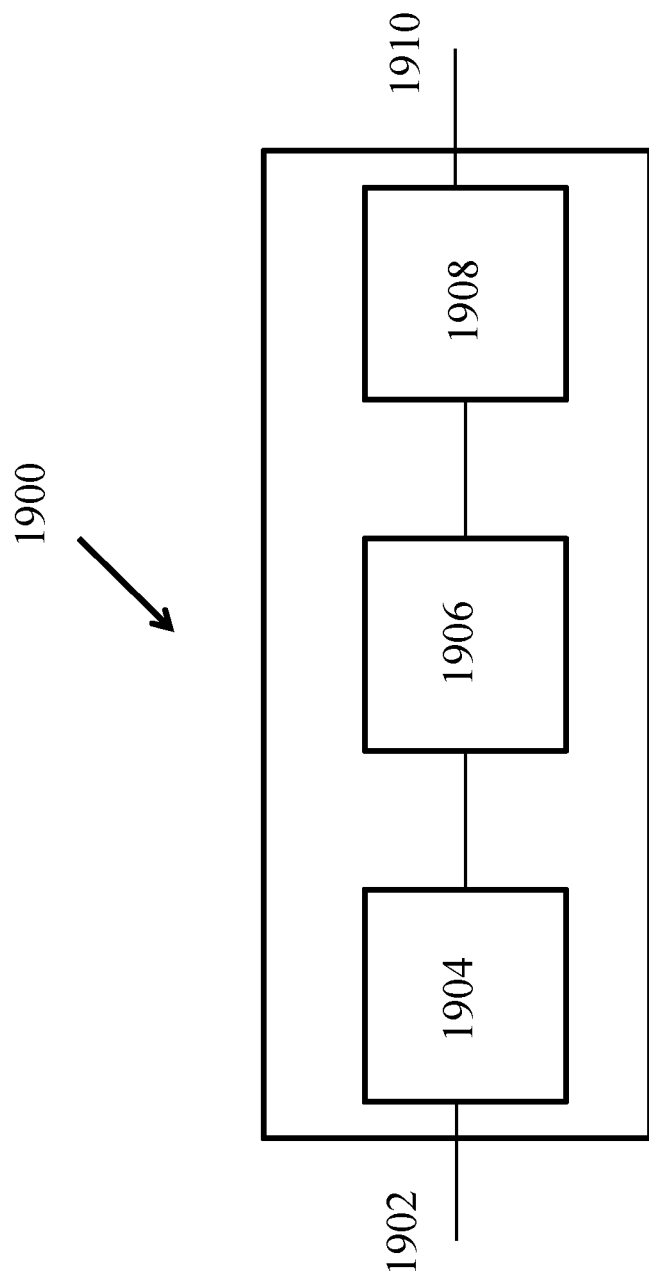
FIG. 1 is a block diagram that illustrates a video coding system in accordance with some implementations of the disclosed technology.

Section headings are used in the present document for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also.

1. Introduction

This document is related to video coding technologies. Specifically, it is about defining levels and bitstream conformance for a video codec that supports both single-layer video coding and multi-layer video coding. It may be applied to any video coding standard or non-standard video codec that supports single-layer video coding and multi-layer video coding, e.g., Versatile Video Coding (VVC) that is being developed.

2. Abbreviations
  APS Adaptation Parameter Set
  AU Access Unit
  AUD Access Unit Delimiter
  AVC Advanced Video Coding
  BP Buffering Period
  CLVS Coded Layer Video Sequence
  CPB Coded Picture Buffer
  CRA Clean Random Access
  CTU Coding Tree Unit
  CVS Coded Video Sequence
  DPB Decoded Picture Buffer
  DPS Decoding Parameter Set
  DUI Decoding Unit Information
  EOB End Of Bitstream
  EOS End Of Sequence
  GCI General Constraints Information
  GDR Gradual Decoding Refresh
  HEVC High Efficiency Video Coding
  HRD Hypothetical Reference Decoder
  IDR Instantaneous Decoding Refresh
  JEM Joint Exploration Model
  MCTS Motion-Constrained Tile Sets
  NAL Network Abstraction Layer
  OLS Output Layer Set
  PH Picture Header
  PPS Picture Parameter Set
  PT Picture Timing
  PTL Profile, Tier and Level
  PU Picture Unit
  RRP Reference Picture Resampling
  RB SP Raw Byte Sequence Payload
  SEI Supplemental Enhancement Information
  SH Slice Header
  SLI Subpicture Level Information
  SPS Sequence Parameter Set
  SVC Scalable Video Coding
  VCL Video Coding Layer
  VPS Video Parameter Set
  VTM VVC Test Model
  VUI Video Usability Information
  VVC Versatile Video Coding 3. Initial Discussion Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, the Joint Video Exploration Team (JVET) was founded by VCEG and MPEG jointly in 2015. Since then, many new methods have been adopted by JVET and put into the reference software named Joint Exploration Model (JEM). The JVET meeting is concurrently held once every quarter, and the new coding standard is targeting at 50% bitrate reduction as compared to HEVC. The new video coding standard was officially named as Versatile Video Coding (VVC) in the April 2018 JVET meeting, and the first version of VVC test model (VTM) was released at that time. As there are continuous effort contributing to VVC standardization, new coding techniques are being adopted to the VVC standard in every JVET meeting. The VVC working draft and test model VTM are then updated after every meeting. The VVC project is now aiming for technical completion (FDIS) at the July 2020 meeting.

3.1. Parameter Sets

AVC, HEVC, and VVC specify parameter sets. The types of parameter sets include SPS, PPS, APS, and VPS. SPS and PPS are supported in all of AVC, HEVC, and VVC. VPS was introduced since HEVC and is included in both HEVC and VVC. APS was not included in AVC or HEVC but is included in the latest VVC draft text.

SPS was designed to carry sequence-level header information, and PPS was designed to carry infrequently changing picture-level header information. With SPS and PPS, infrequently changing information need not to be repeated for each sequence or picture, hence redundant signaling of this information can be avoided. Furthermore, the use of SPS and PPS enables out-of-band transmission of the important header information, thus not only avoiding the need for redundant transmissions but also improving error resilience.

VPS was introduced for carrying sequence-level header information that is common for all layers in multi-layer bitstreams.

APS was introduced for carrying such picture-level or slice-level information that needs quite some bits to code, can be shared by multiple pictures, and in a sequence there can be quite many different variations.

3.2. Picture Resolution Change within a Sequence

In AVC and HEVC, the spatial resolution of pictures cannot change unless a new sequence using a new SPS starts, with an TRAP picture. VVC enables picture resolution change within a sequence at a position without encoding an TRAP picture, which is always intra-coded. This feature is sometimes referred to as reference picture resampling (RPR), as the feature needs resampling of a reference picture used for inter prediction when that reference picture has a different resolution than the current picture being decoded.

The scaling ratio is restricted to be larger than or equal to 1/2 (2 times downsampling from the reference picture to the current picture), and less than or equal to 8 (8 times upsampling). Three sets of resampling filters with different frequency cutoffs are specified to handle various scaling ratios between a reference picture and the current picture. The three sets of resampling filters are applied respectively for the scaling ratio ranging from 1/2 to 1/1.75, from 1/1.75 to 1/1.25, and from 1/1.25 to 8. Each set of resampling filters has 16 phases for luma and 32 phases for chroma which is same to the case of motion compensation interpolation filters. Actually the normal MC interpolation process is a special case of the resampling process with scaling ratio ranging from 1/1.25 to 8. The horizontal and vertical scaling ratios are derived based on picture width and height, and the left, right, top and bottom scaling offsets specified for the reference picture and the current picture.

Other aspects of the VVC design for support of this feature that are different from HEVC include: i) The picture resolution and the corresponding conformance window are signaled in the PPS instead of in the SPS, while in the SPS the maximum picture resolution is signaled. ii) For a single-layer bitstream, each picture store (a slot in the DPB for storage of one decoded picture) occupies the buffer size as required for storing a decoded picture having the maximum picture resolution.

3.3. Scalable Video Coding (SVC) in General and in VVC

Scalable video coding (SVC, sometimes also just referred to as scalability in video coding) refers to video coding in which a base layer (BL), sometimes referred to as a reference layer (RL), and one or more scalable enhancement layers (ELs) are used. In SVC, the base layer can carry video data with a base level of quality. The one or more enhancement layers can carry additional video data to support, for example, higher spatial, temporal, and/or signal-to-noise (SNR) levels. Enhancement layers may be defined relative to a previously encoded layer. For example, a bottom layer may serve as a BL, while a top layer may serve as an EL. Middle layers may serve as either ELs or RLs, or both. For example, a middle layer (e.g., a layer that is neither the lowest layer nor the highest layer) may be an EL for the layers below the middle layer, such as the base layer or any intervening enhancement layers, and at the same time serve as a RL for one or more enhancement layers above the middle layer. Similarly, in the Multiview or 3D extension of the HEVC standard, there may be multiple views, and information of one view may be utilized to code (e.g., encode or decode) the information of another view (e.g., motion estimation, motion vector prediction and/or other redundancies).

In SVC, the parameters used by the encoder or the decoder are grouped into parameter sets based on the coding level (e.g., video-level, sequence-level, picture-level, slice level, etc.) in which they may be utilized. For example, parameters that may be utilized by one or more coded video sequences of different layers in the bitstream may be included in a video parameter set (VPS), and parameters that are utilized by one or more pictures in a coded video sequence may be included in a sequence parameter set (SPS). Similarly, parameters that are utilized by one or more slices in a picture may be included in a picture parameter set (PPS), and other parameters that are specific to a single slice may be included in a slice header. Similarly, the indication of which parameter set(s) a particular layer is using at a given time may be provided at various coding levels.

Thanks to the support of reference picture resampling (RPR) in VVC, support of a bitstream containing multiple layers, e.g., two layers with SD and HD resolutions in VVC can be designed without the need any additional signal-processing-level coding tool, as upsampling needed for spatial scalability support can just use the RPR upsampling filter. Nevertheless, high-level syntax changes (compared to not supporting scalability) are needed for scalability support. Scalability support is specified in VVC version 1. Different from the scalability supports in any earlier video coding standards, including in extensions of AVC and HEVC, the design of VVC scalability has been made friendly to single-layer decoder designs as much as possible. The decoding capability for multi-layer bitstreams are specified in a manner as if there were only a single layer in the bitstream. E.g., the decoding capability, such as DPB size, is specified in a manner that is independent of the number of layers in the bitstream to be decoded. Basically, a decoder designed for single-layer bitstreams does not need much change to be able to decode multi-layer bitstreams. Compared to the designs of multi-layer extensions of AVC and HEVC, the HLS aspects have been significantly simplified at the sacrifice of some flexibilities. For example, an TRAP AU is required to contain a picture for each of the layers present in the CVS.

3.4. SEI Messages and General SEI Semantics and Constraints

Annex D of VVC specifies syntax and semantics for SEI message payloads for some SEI messages, and specifies the use of the SEI messages and VUI parameters for which the syntax and semantics are specified in ITU-T H.SEI|ISO/IEC 23002-7.

SEI messages assist in processes related to decoding, display or other purposes. However, SEI messages are not required for constructing the luma or chroma samples by the decoding process. Conforming decoders are not required to process this information for output order conformance. Some SEI messages are required for checking bitstream conformance and for output timing decoder conformance. Other SEI messages are not required for check bitstream conformance.

In the latest VVC draft text, the general SEI.

The syntax and semantics of the scalable nesting SEI message in the latest VVC draft text are as follows.

D.2.1 General SEI Message Syntax

| | Descriptor |
|---|---|
| ```
sei_payload( payloadType, payloadSize ) {
  if( nal_unit_type == PREFIX_SEI_NUT )
    if( payloadType = = 0 )
      buffering_period( payloadSize )
    else if( payloadType = = 1)
      pic_timing( payloadSize)
    else if( payloadType = = 3 )
      filler_payload( payloadSize ) /* Specified in ITU-T H.SEI | ISO/IEC 23002-7 */
    else if( payloadType = = 4 ) /* Specified in ITU-T H.SEI | ISO/IEC 23002-7 */
      user_data_registered_itu_t_t35( payloadSize )
    else if( payloadType = = 5 ) /* Specified in ITU-T H.SEI | ISO/IEC 23002-7 */
      user_data_unregistered( payloadSize )
    else if( payloadType = = 19) /* Specified in ITU-T H.SEI | ISO/IEC 23002-7 */
      film_grain_characteristics( payloadSize )
    else if( payloadType = = 45 ) /* Specified in ITU-T H.SEI | ISO/IEC 23002-7 */
      frame_packing_arrangement( payloadSize )
    else if( payloadType = = 129 ) /* Specified in ITU-T H.SEI | ISO/IEC 23002-7 */
      parameter_sets_inclusion_indication( payloadSize )
    else if( payloadType = = 130 )
      decoding_unit_info( payloadSize )
    else if( payloadType = = 133 )
      scalable_nesting( payloadSize)
    else if( payloadType = = 137 ) /* Specified in ITU-T H.SEI | ISO/IEC 23002-7 */
      mastering_display_colour_volume( payloadSize )
    else if( payloadType = = 144 ) /* Specified in ITU-T H.SEI | ISO/IEC 23002-7 */
      content_light_level_info( payloadSize )
    else if( payloadType = = 145 ) /* Specified in ITU-T H.SEI | ISO/IEC 23002-7 */
      dependent_rap_indication( payloadSize )
    else if( payloadType = = 147 ) /* Specified in ITU-T H.SEI | ISO/IEC 23002-7 */
      alternative_transfer_characteristics( payloadSize )
    else if( payloadType = = 148 ) /* Specified in ITU-T H.SEI | ISO/IEC 23002-7 */
      ambient_viewing_environment( payloadSize )
    else if( payloadType = = 149 ) /* Specified in ITU-T H.SEI | ISO/IEC 23002-7 */
      content_colour_volume( payloadSize )
    else if( payloadType = = 150 ) /* Specified in ITU-T H.SEI | ISO/IEC 23002-7 */
      equirectangular_projection( payloadSize )
    else if( payloadType = = 153 ) /* Specified in ITU-T H.SEI | ISO/IEC 23002-7 */
      generalized_cubemap_projection( payloadSize )
    else if( payloadType = = 154 ) /* Specified in ITU-T H.SEI | ISO/IEC 23002-7 */
      sphere_rotation( payloadSize )
    else if( payloadType = = 155 ) /* Specified in ITU-T H.SEI | ISO/IEC 23002-7 */
      regionwise_packing( payloadSize )
    else if( payloadType = = 156 ) /* Specified in ITU-T H.SEI | ISO/IEC 23002-7 */
      omni_viewport( payloadSize )
    else if( payloadType = = 168 ) /* Specified in ITU-T H.SEI | ISO/IEC 23002-7 */
      frame_field_info( payloadSize )
    else if( payloadType = = 203 )
      subpic_level_info( payloadSize )
    else if( payloadType = = 204 ) /* Specified in ITU-T H.SEI | ISO/IEC 23002-7 */
      sample_aspect_ratio_info( payloadSize)
    else/*         Specified in ITU-T H. SEI | ISO/IEC 23002-7 */
      reserved_message( payloadSize )
  else /* nal_unit_type = = SUFFIXSEINUT */
    if( payloadType = = 3 ) /* Specified in ITU-T H.SEI | ISO/IEC 23002-7 */
      filler_payload( payloadSize )
    if( payloadType = = 132 ) /* Specified in ITU-T H.SEI | ISO/IEC 23002-7 */
      decoded_picture_hash( payloadSize )
    else if( payloadType = = 133 )
      scalable_nesting( payloadSize )
    else           /* Specified in ITU-T H.SEI | ISO/IEC 23002-7 */
      reserved_message( payloadSize )
  if( more_data_in_payload( ) ) {
    if( payload_extension_present( ) )
      reserved_payload_extension_data
      payload_bit_equal_to_one /* equal to 1 */
    while( !byte_aligned( ) )
``` | <br><br><br><br><br><br><br><br><br><br><br><br><br><br><br><br><br><br><br><br><br><br><br><br><br><br><br><br><br><br><br><br><br><br><br><br><br><br><br><br><br><br><br><br><br><br><br><br><br><br><br><br><br><br><br><br><br><br><br><br><br><br><br>u(v)<br>f(1)<br> |

| | Descriptor |
|---|---|
| payload_bit_equal_to_zero /* equal to 0 */ } } | f(1) |

D.2.2 General SEI Payload Semantics reserved_payload_extension_data shall not be present in bitstreams conforming to this version of this Specification. However, decoders conforming to this version of this Specification shall ignore the presence and value of reserved_payload_extension_data. When present, the length, in bits, of reserved_payload_extension_data is equal to 8*payloadSize−nEarlierBits−nPayloadZeroBits−1, where nEarlierBits is the number of bits in the sei_payload( ) syntax structure that precede the reserved_payload_extension_data syntax element, and nPayloadZeroBits is the number of payload_bit_equal_to_zero syntax elements at the end of the sei_payload( ) syntax structure.

payload_bit_equal_to_one shall be equal to 1.
payload_bit_equal_to_zero shall be equal to 0.

NOTE 1—SEI messages with the same value of payloadType are conceptually the same SEI message regardless of whether they are contained in prefix or suffix SEI NAL units.

NOTE 2—For SEI messages with payloadType in the mange of 0 to 47, inclusive, that are specified in this Specification, the payloadType values are aligned with similar SEI messages specified in Rec. ITU-T H.264|ISO/IEC 14496-10.

The semantics and persistence scope for each SEI message are specified in the semantics specification for each particular SEI message.

NOTE 3—Persistence information for SEI messages is informatively summarized in Table D.1.

TABLE D.1

Persistence scope of SEI messages (informative)

| SEI message | Persistence scope |
|---|---|
| Buffering period | The remainder of the bitstream |
| Picture timing | The AU containing the SEI message |
| DU information | The AU containing the SEI message |
| Scalable nesting | Depending on the scalable-nested SEI messages. Each scalable-nested SEI message has the same persistence scope as if the SEI message was not scalable-nested |
| Subpicture level information | The CLVS containing the SEI message |

The list VclAssociatedSeiList is set to consist of the payloadType values 3, 19, 45, 129, 132, 137, 144, 145, 147 to 150, inclusive, 153 to 156, inclusive, 168, 203, and 204.
The list PicUnitRepConSeiList is set to consist of the payloadType values 0, 1, 19, 45, 129, 132, 133, 137, 147 to 150, inclusive, 153 to 156, inclusive, 168, 203, and 204.

NOTE 4—VclAssociatedSeiList consists of the payloadType values of the SEI messages that, when non-scalable-nested and contained in an SEI NAL unit, infer constraints on the NAL unit header of the SEI NAL unit on the basis of the NAL unit header of the associated VCL NAL unit. PicUnitRepConSeiList consists of the payloadType values of the SEI messages that are subject to the restriction on 4 repetitions per PU.

It is a requirement of bitstream conformance that the following restrictions apply on containing of SEI messages in SEI NAL units:

When an SEI NAL unit contains a non-scalable-nested BP SEI message, a non-scalable-nested PT SEI message, or a non-scalable-nested DUI SEI message, the SEI NAL unit shall not contain any other SEI message with payloadType not equal to 0 (BP), 1 (PT), or 130 (DUI).

When an SEI NAL unit contains a scalable-nested BP SEI message, a scalable-nested PT SEI message, or a scalable-nested DUI SEI message, the SEI NAL unit shall not contain any other SEI message with payloadType not equal to 0 (BP), 1 (PT), 130 (DUI) or 133 (scalable nesting).

The following applies on the applicable OLSs or layers of non-scalable-nested SEI messages:

For a non-scalable-nested SEI message, when payloadType is equal to 0 (BP), 1 (PT), or 130 (DUI), the non-scalable-nested SEI message applies only to the 0-th OLS.

For a non-scalable-nested SEI message, when payloadType is equal to any value among VclAssociatedSeiList, the non-scalable-nested SEI message applies only to the layer for which the VCL NAL units have nuh_layer_id equal to the nuh_layer_id of the SEI NAL unit containing the SEI message.

It is a requirement of bitstream conformance that the following restrictions apply on the value of nuh_layer_id of SEI NAL units:

When a non-scalable-nested SEI message has payloadType equal to 0 (BP), 1 (PT), or 130 (DUI), the SEI NAL unit containing the non-scalable-nested SEI message shall have nuh_layer_id equal to vps_layer_id[0].

When a non-scalable-nested SEI message has payloadType equal to any value among VclAssociatedSeiList, the SEI NAL unit containing the non-scalable-nested SEI message shall have nuh_layer_id equal to the value of nuh_layer_id of the VCL NAL unit associated with the SEI NAL unit.

An SEI NAL unit containing a scalable nesting SEI message shall have nuh_layer_id equal to the lowest value of nuh_layer_id of all layers to which the scalable-nested SEI messages apply (when sn_ols_flag of the scalable nesting SEI message is equal to 0) or the lowest value of nuh_layer_id of all layers in the OLSs to which the scalable-nested SEI message apply (when sn_ols_flag of the scalable nesting SEI message is equal to 1).

It is a requirement of bitstream conformance that the following restrictions apply on repetition of SEI messages:

For each of the payloadType values included in PicUnitRepConSeiList, there shall be less than or equal to 4 identical sei_payload( ) syntax structures within a PU.

There shall be less than or equal to 4 identical sei_payload( ) syntax structures with payloadType equal to 130 within a DU.

The following applies on the order of BP, PT, and DUI SEI messages:

When a BP SEI message and a PT SEI message that apply to a particular OP are present within an AU, the BP SEI messages shall precede the PT SEI message in decoding order.

When a BP SEI message and a DUI SEI message that apply to a particular OP are present within an AU, the BP SEI messages shall precede the DUI SEI message in decoding order.

When a PT SEI message and a DUI SEI message that apply to a particular OP are present within an AU, the PT SEI messages shall precede the DUI SEI message in decoding order.

4. Technical Problems Solved by Disclosed Technical Solutions

The existing general SEI payload semantics, including the general SEI constraints, has the following problems:

1) Non-scalable-nested HRD-related SEI messages should be specified to apply to the OLSs that include the same set of layers as the entire bitstream (instead of apply only to the 0th OLS).
2) An entire bitstream may include multiple layers while there is no OLS specified that includes all the layer. In this case, there cannot be any non-scalable-nested HRD-related SEI message, as they would apply to the OLSs that include the same set of layers as the entire bitstream.
3) It is currently specified that a non-scalable-nested non-HRD-related SEI message only applies to the layer with nuh_layer_id equal to that of the SEI NAL unit. However, to be consistent with non-scalable-nested HRD-related SEI messages, it should be specified that non-scalable-nested non-HRD-related SEI messages apply to all layers in the entire bitstream.
4) It is currently specified that the value of nuh_layer_id for an SEI NAL unit containing non-scalable-nested HRD-related SEI messages shall be equal to vps_layer_id[0] and the value of nuh_layer_id for an SEI NAL unit containing non-scalable-nested non-HRD-related SEI messages shall be equal to the nuh_layer_id of the VCL NAL unit associated with the SEI NAL unit. However, as non-scalable-nested SEI messages apply to the entire bitstream, these constraints on the value of nuh_layer_id should be removed, such that the value of nuh_layer_id for SEI NAL units containing non-scalable-nested SEI messages is unconstrained, same as for the nuh_layer_id for DCI, VPS, AUD, and EOS NAL units.
5) The list variable VclAssociatedSeiList currently consists of the SEI payloadType values for non-HRD-related SEI messages. However, the value 203, for the SLI SEI message, is also an HRD-related SEI message. Therefore, the payloadType value 203 (SLI) should be removed from the list.
6) There lacks a constraint such that when general_same_pic_timing_in_all_ols_flag is equal to 1, there shall be no SEI NAL unit that contain a scalable-nested SEI message with payloadType equal to 1 (PT). This is because when general_same_pic_timing_in_all_ols_flag is equal to 1, there is no need to have PT SEI messages contained in scalable nesting SEI messages.
7) There lacks a constraint such that when an SEI NAL unit contains a non-scalable-nested SEI message with payloadType equal to 0 (BP), 1 (PT), 130 (DUI), or 203 (SLI), the SEI NAL unit shall not contain any other SEI message with payloadType not equal to 0, 1, 130, or 203. Only with this, removal of these four HRD-related SEI messages from the output bitstream during a sub-bitstream extraction process can be performed by simply removing SEI NAL units containing one or more of these SEI messages.
8) There lacks a constraint such that when an SEI NAL unit contains a scalable-nested SEI message with payloadType equal to 0 (BP), 1 (PT), 130 (DUI), or 203 (SLI), the SEI NAL unit shall not contain any other SEI message with payloadType not equal to 0, 1, 130, 203, or 133 (scalable nesting). Only with this, it is possible to set the value of sn_ols_flag of scalable nesting SEI messages for scalable-nested HRD-related and non-HRD-related SEI messages without a problem.
9) There lacks a constraint such that when an SEI NAL unit contains an SEI message with payloadType equal to 3 (filler payload), the SEI NAL unit shall not contain any other SEI message with payloadType not equal to 3. Only with this, removal of filler payload SEI messages from the output bitstream during a sub-bitstream extraction process can be performed by simply removing SEI NAL units containing one or more filler payload SEI messages.
10) There lacks a constraint such that when an SLI SEI message and a BP SEI message that apply to a particular OLS are present within an AU, the SLI SEI messages shall precede the BP SEI message in decoding order. This is needed because an SLI SEI message provides sequence level information like VPSs and SPSs, which also precede BP SEI messages, when present within the same AU as the BP SEI messages.
11) In the BP SEI message, the bp_sublayer_initial_cpb_removal_delay_present_flag is signalled even when bp_max_sublayers_minus1 is equal to 0. However, when bp_max_sublayers_minus1 is equal to 0, the value of bp_sublayer_initial_cpb_removal_delay_present_flag is known to be 0.

5. Examples of Solutions and Embodiments

To solve the above problems, and others, methods as summarized below are disclosed. The solution items should be considered as examples to explain the general concepts and should not be interpreted in a narrow way. Furthermore, these items can be applied individually or combined in any manner.

1) To solve the 1st problem, specify that non-scalable-nested HRD-related SEI messages apply to the OLSs that include the same set of layers as the entire bitstream (instead of apply only to the 0th OLS).
   a. In one example, HRD-related SEI messages refer to SEI messages with payloadType equal to 0 (BP), 1 (PT), 130 (DUI), or 203 (SLI).
2) To solve the 2nd problem, add a constraint such that when there is no OLS that includes the set of layers same as the entire bitstream, there shall be no non-scalable-nested HRD-related SEI messages.
   a. In one example, HRD-related SEI messages refer to SEI messages with payloadType equal to 0 (BP), 1 (PT), 130 (DUI), or 203 (SLI).
3) To solve the 3rd problem, specify that non-scalable-nested non-HRD-related SEI messages are applicable to all layers in the entire bitstream, to be consistent with non-scalable-nested HRD-related SEI messages.
   a. In one example, non-HRD-related SEI messages refer to SEI messages with payloadType not equal to 0 (BP), 1 (PT), 130 (DUI), or 203 (SLI).

4) To solve the 4th problem, remove the constraints on the value of nuh_layer_id for SEI NAL units containing non-scalable-nested SEI messages, such that the value of nuh_layer_id for SEI NAL units containing non-scalable-nested SEI messages is unconstrained, same as for the nuh_layer_id for DCI, VPS, AUD, and EOS NAL units.
5) To solve the 5th problem, rename VclAssociatedSeiList to NestingForLayersSeiList, and remove payloadType value 203 (SLI) from the list.
6) To solve the 6th problem, add a constraint such that when general_same_pic_timing_in_all_ols_flag is equal to 1, there shall be no SEI NAL unit that contain a scalable-nested SEI message with payloadType equal to 1 (PT).
   a. In one example, additionally, it is specified that when general_same_pic_timing_in_all_ols_flag is equal to 1, non-scalable-nested PT SEI messages apply to all OLSs as well as to the subpicture sequences that can be extracted from the bitstreams of the OLSs.
   b. In one example, alternatively, add a constraint such that when general_same_pic_timing_in_all_ols_flag is equal to 1, there shall be no SEI NAL unit that contains a scalable-nested SEI message with payloadType equal to 1 (PT) for which sn_subpic_flag is equal to 0.
7) To solve the 7th problem, it is specified that when an SEI NAL unit contains a non-scalable-nested SEI message with payloadType equal to 0 (BP), 1 (PT), 130 (DUI), or 203 (SLI), the SEI NAL unit shall not contain any other SEI message with payloadType not equal to 0, 1, 130, or 203.
8) To solve the 8th problem, it is specified that when an SEI NAL unit contains a scalable-nested SEI message with payloadType equal to 0 (BP), 1 (PT), 130 (DUI), or 203 (SLI), the SEI NAL unit shall not contain any other SEI message with payloadType not equal to 0, 1, 130, 203, or 133 (scalable nesting).
9) To solve the 9th problem, add a constraint such that when an SEI NAL unit contains an SEI message with payloadType equal to 3 (filler payload), the SEI NAL unit shall not contain any other SEI message with payloadType not equal to 3.
   a. In one example, additionally, it is specified that filler data SEI messages shall not be scalable-nested, i.e., shall not be contained in a scalable nesting SEI message.
   b. In one example, alternatively, add a constraint such that when an SEI NAL unit contains an SEI message with payloadType equal to 3 (filler payload), the SEI NAL unit shall not contain any other SEI message with payloadType not equal to 3 or 133 (scalable nesting).
10) To solve the 10th problem, add a constraint such that when an SLI SEI message and a BP SEI message that apply to a particular OLS are present within an AU, the SLI SEI messages shall precede the BP SEI message in decoding order.
11) To solve the 11th problem, it is specified that, when bp_max_sublayers_minus1 is equal to 0, bp_sublayer_initial_cpb_removal_delay_present_flag is skipped (i.e., not signalled in the BP SEI message).
   a. In one example, additionally, when bp_max_sublayers_minus1 is equal to 0, the value of bp_sublayer_initial_cpb_removal_delay_present_flag is inferred to be equal to 0.

6. Embodiments

Below are some example embodiments for some of the invention aspects summarized above in this Section, which can be applied to the VVC specification. The changed texts are based on the latest VVC text in JVET-S0152-v5. Most relevant parts that have been added or modified are bold and Italic, and some of the deleted parts are marked with double brackets (e.g., denotes the deletion of the character "a").

6.1. Embodiment 1

This embodiment is for items 1 to 11 and some of their sub-items.
D.2.2 General SEI Payload Semantics
The list [[VclAssociated]]*NestingForLayers* SeiList is set to consist of the payloadType values 3, 19, 45, 129, 132, 137, 144, 145, 147 to 150, inclusive, 153 to 156, inclusive, 168, and 204.
The list PicUnitRepConSeiList is set to consist of the payloadType values 0, 1, 19, 45, 129, 132, 133, 137, 147 to 150, inclusive, 153 to 156, inclusive, 168, 203, and 204.
   NOTE 4—[[VclAssociatedSeiList consists of the payloadType values of the SEI messages that, when non-scalable-nested and contained in an SEI NAL unit infer constraints on the NAL unit header of the SEI NAL unit on the basis of the NAL unit header of the associated VCL NAL unit.]]*NestingForLayersSeiList consists of the payloadType values of the non-HRD- related SEI messages, for which, when scalable-nested, the value of sn_ols_flag of the containing scalable nesting SEI message shall be equal to 1*. PicUnitRepConSeiList consists of the payloadType values of the SEI messages that are subject to the restriction on 4 repetitions per PU.
It is a requirement of bitstream conformance that the following restrictions apply on containing of SEI messages in SEI NAL units:
   – *When general_same_pic_ timing_in_all_ols_flag is equal to 1, there shall be no SEI NAL unit that contain a scalable-nested SEI message with payloadType equal to 1 (PT).*
   When an SEI NAL unit contains a non-scalable-nested SEI message with payloadType equal to 0 (BP), 1 (PT), [[or]] 130 (DUI), *or 203 (SLI)*, the SEI NAL unit shall not contain any other SEI message with payloadType not equal to 0, 1, [[or]] 130, *or 203*.
   When an SEI NAL unit contains a scalable-nested SEI message with payloadType equal to 0 (BP), 1 (PT), [[or]] 130 (DUI), *or 203 (SLI)*, the SEI NAL unit shall not contain any other SEI message with payloadType not equal to 0, 1, 130, *203*, or 133 (scalable nesting).
   When an SEI NAL unit contains an SEI message with payloadType equal to 3 (filler payload), the SEI NAL unit shall not contain any other SEI message with payloadType not equal to 3.
The following applies on the applicable OLSs or layers of non-scalable-nested SEI messages:
   For a non-scalable-nested SEI message when payloadType is equal to 0 (BP), 1 (PT), [[or]] 130 (DUI), or 203 (SLI), the non-scalable-nested SEI message applies *to the OLSs, when present, that include the same set of layers as in the entire bitstream* [[only to the 0-th OLS]].   *When there is no OLS*

*that includes the same set of
layers as the entire bitstream, there shall be no non-
scalable-nested SEI message
with payloadType equal to 0
(BP), 1 (PT), 130 (DUI), or 203 (SLI).*
For a non-scalable-nested SEI message, when payload-
Type is equal to any value among [[VclAssociated]]
*NestingForLayers* SeiList, the non-scalable-nested
SEI message applies **to all layers in the
entire bitstream** [[only to the layer for which the VCL
NAL units have nuh_layer_id equal to the nuh_layer_id
of the SEI NAL unit containing the SEI message]].
It is a requirement of bitstream conformance that the fol-
lowing restrictions apply on the value of nuh_layer_id of
SEI NAL units:
  [[When a non-scalable-nested SEI message has payload-
  Type equal to 0 (BP), 1 (PT), or 130 (DUI), the SEI
  NAL unit containing the non-scalable-nested SEI mes-
  sage shall have nuh_layer_id equal to vps_layer_id[0].
  When a non-scalable-nested SEI message has payload-
  Type equal to any value among VclAssociatedSeiList,
  the SEI NAL unit containing the non-scalable-nested
  SEI message shall have nuh_layer_id equal to the value
  of nuh_layer_id of the VCL NAL unit associated with
  the SEI NAL unit.]]
  An SEI NAL unit containing a scalable nesting SEI
  message shall have nuh_layer_id equal to the lowest
  value of nuh_layer_id of all layers to which the scal-
  able-nested SEI messages apply (when sn_ols_flag of
  the scalable nesting SEI message is equal to 0) or the
  lowest value of nuh_layer_id of all layers in the OLSs
  to which the scalable-nested SEI message apply (when
  sn_ols_flag of the scalable nesting SEI message is
  equal to 1).
  *NOTE 4 - Same as for DCI,
  VPS, AUD, and EOB NAL units,
  the value of nuh_layer_
  id for SEI NAL units that do
  not contain a scalable nesting
  SEI message is not constrained.*
It is a requirement of bitstream conformance that the fol-
lowing restrictions apply on repetition of SEI messages:
  For each of the payloadType values included in PicUni-
  tRepConSeiList, there shall be less than or equal to 4
  identical sei_payload( ) syntax structures within a PU.
  There shall be less than or equal to 4 identical sei_pay-
  load( ) syntax structures with payloadType equal to 130
  within a DU.
The following applies on the order of SLI, BP, PT, and DUI
SEI messages: *a particular OLS are*
  – *When an SLI SEI message and
  a BP SEI message that apply to
  a particular OLS are present within an AU,
  the SLI SEI messages shall precede the BP SEI
  message in decoding order.*
  When a BP SEI message and a PT SEI message that apply
  to a particular [[OP]]OLS are present within an AU, the
  BP SEI messages shall precede the PT SEI message in
  decoding order.
  When a BP SEI message and a DUI SEI message that
  apply to a particular [[OP]]OLS are present within an
  AU, the BP SEI messages shall precede the DUI SEI
  message in decoding order.
  When a PT SEI message and a DUI SEI message that
  apply to a particular [[OP]]OLS are present within an
  AU, the PT SEI messages shall precede the DUI SEI
  message in decoding order.

D.3.1 Buffering Period SEI Message Syntax

| | Descriptor |
|---|---|
| buffering_period( payloadSize ) { | |
| ... | |
|   if( bp_max_sublayers_minus1 > 0 ) | |
|     bp_sublayer_initial_cpb_removal_delay_present_flag | u(1) |
| ... | |
| } | |

D.3.2 Buffering Period SEI Message Semantics bp_sublayer_initial_cpb_removal_delay_present_flag equal to 1 specifies that initial CPB removal delay related syntax elements are present for sublayer representation(s) in the range of 0 to bp_max_sublayers_minus1, inclusive. bp_sublayer_initial_cpb_removal_delay_present_flag equal to 0 specifies that initial CPB removal delay related syntax elements are present for the bp_max_sublayers_minus1-th sublayer representation. *When not present, the value of bp_sublayer_initial_cpb_ removal_delay_present_flag is inferred to be equal to 0.*

FIG. 1 is a block diagram showing an example video processing system 1900 in which various techniques disclosed herein may be implemented. Various implementations may include some or all of the components of the system 1900. The system 1900 may include input 1902 for receiving video content. The video content may be received in a raw or uncompressed format, e.g., 8 or 10 bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1900 may include a coding component 1904 that may implement the various coding or encoding methods described in the present document. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 2:
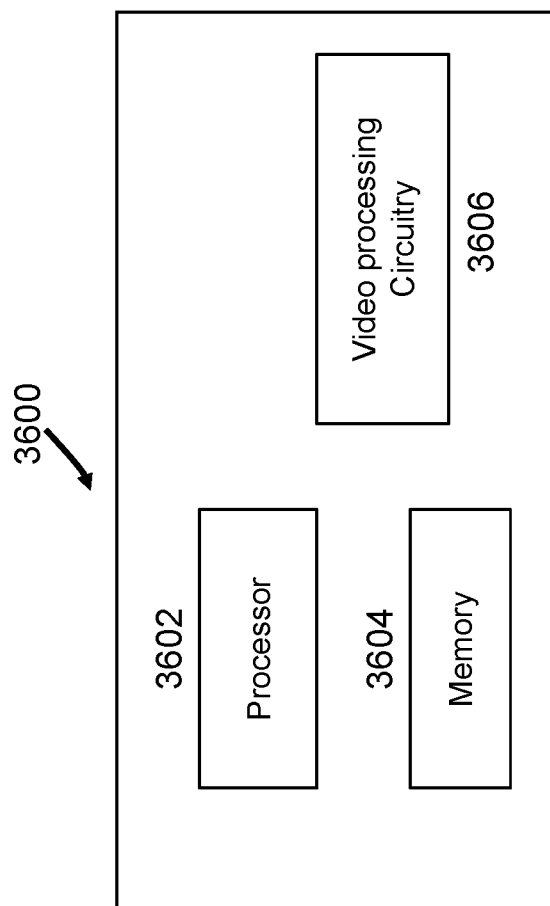
FIG. 2 is a block diagram of an example hardware platform used for video processing.

FIG. 2 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing hardware 3606. The processor(s) 3602 may be configured to implement one or more methods described in the present document. The memory (memories) 3604 may be used for storing data and code used for implementing the methods and techniques described herein. The video processing hardware 3606 may be used to implement, in hardware circuitry, some techniques described in the present document.

Figure 4:
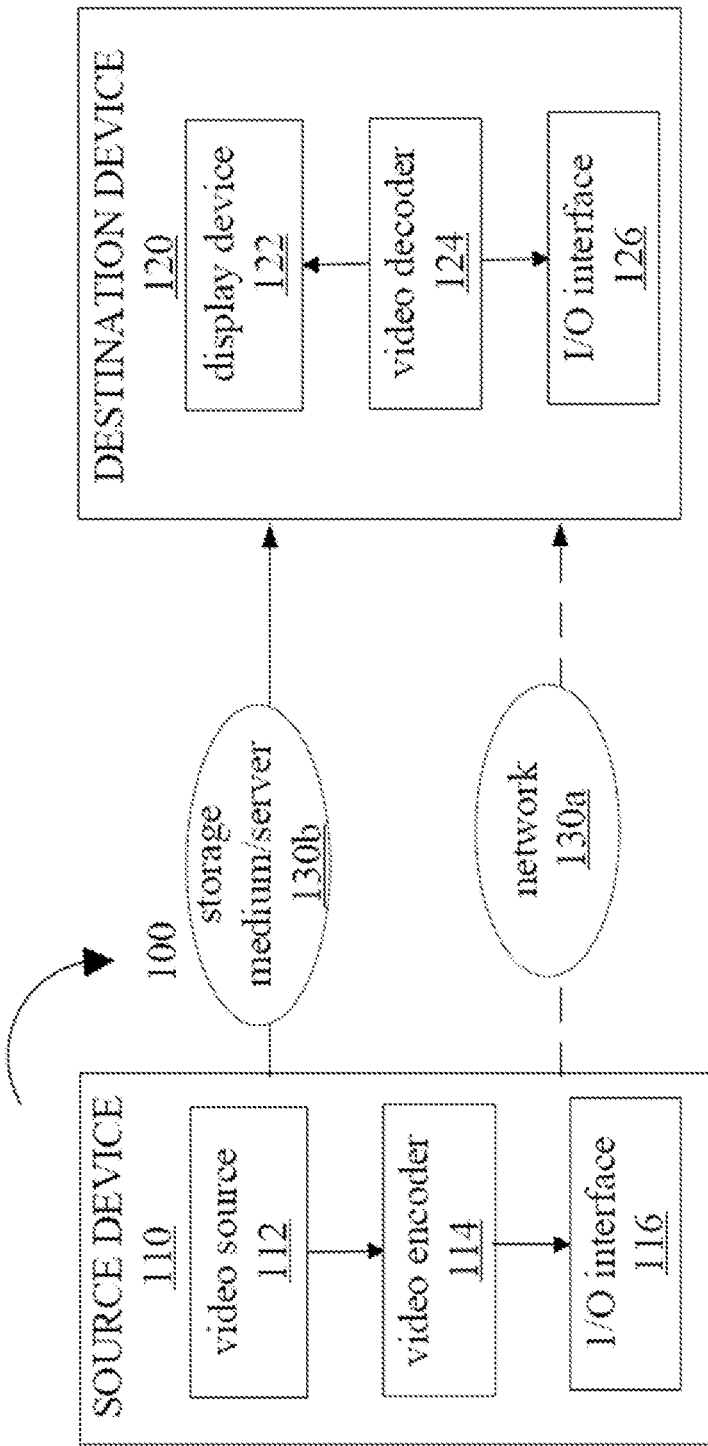
FIG. 4 is a block diagram that illustrates an example video coding system.

FIG. 4 is a block diagram that illustrates an example video coding system 100 that may utilize the techniques of this disclosure.

As shown in FIG. 4, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVC) standard and other current and/or further standards.

Figure 5:
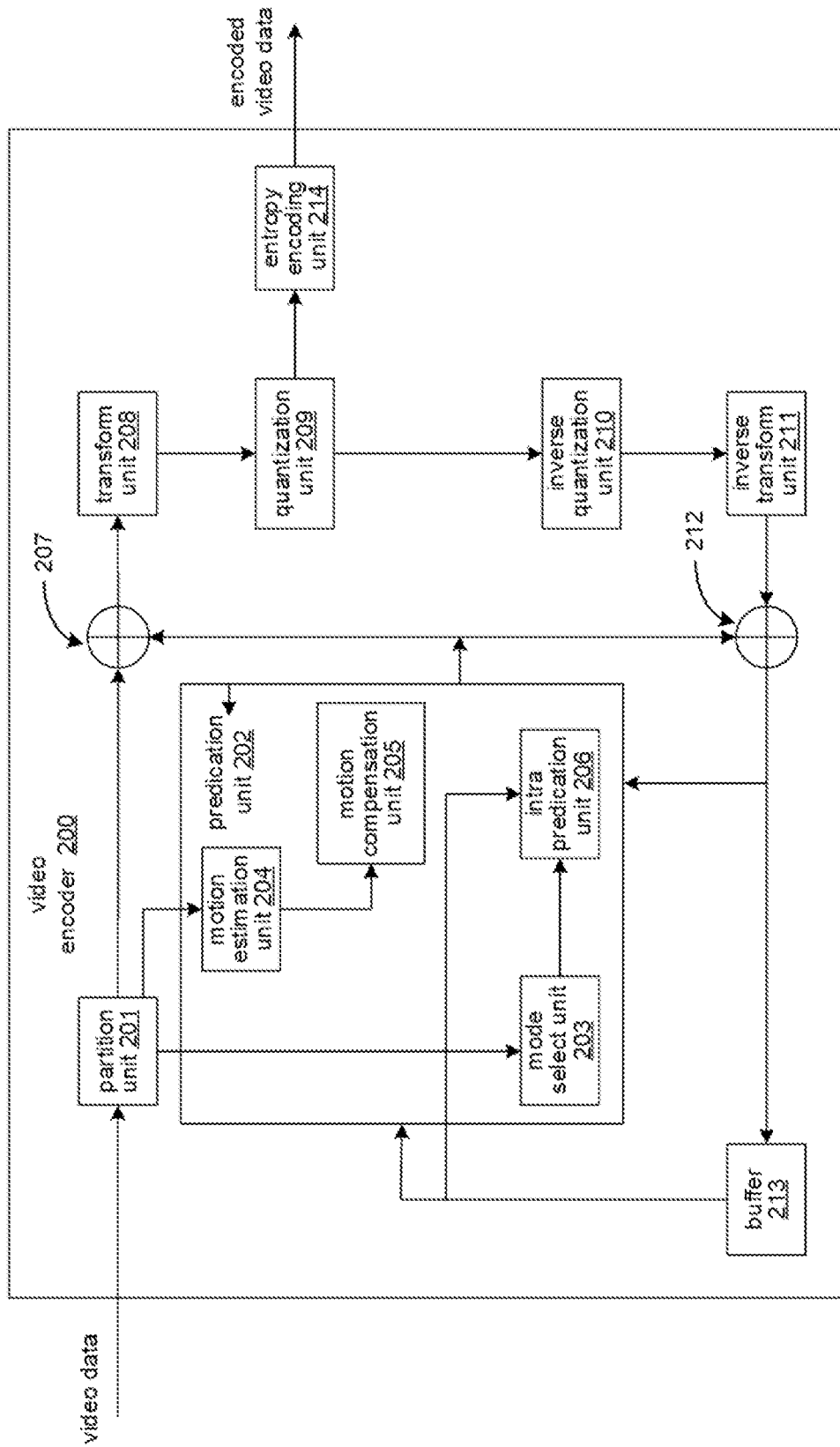
FIG. 5 is a block diagram that illustrates an encoder in accordance with some implementations of the disclosed technology.

FIG. 5 is a block diagram illustrating an example of video encoder 200, which may be video encoder 114 in the system 100 illustrated in FIG. 4.

Video encoder 200 may be configured to perform any or all of the techniques of this disclosure. In the example of FIG. 5, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a predication unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, predication unit 202 may include an intra block copy (IBC) unit. The IBC unit may perform predication in an IBC mode in which at least one reference picture is a picture where the current video block is located.

Furthermore, some components, such as motion estimation unit 204 and motion compensation unit 205 may be highly integrated, but are represented in the example of FIG. 5 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter predication (CIIP) mode in which the predication is based on an inter predication signal and an intra predication signal. Mode select unit 203 may also select a resolution for a motion vector (e.g., a sub-pixel or integer pixel precision) for the block in the case of inter-predication.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may do not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the predication unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 6:
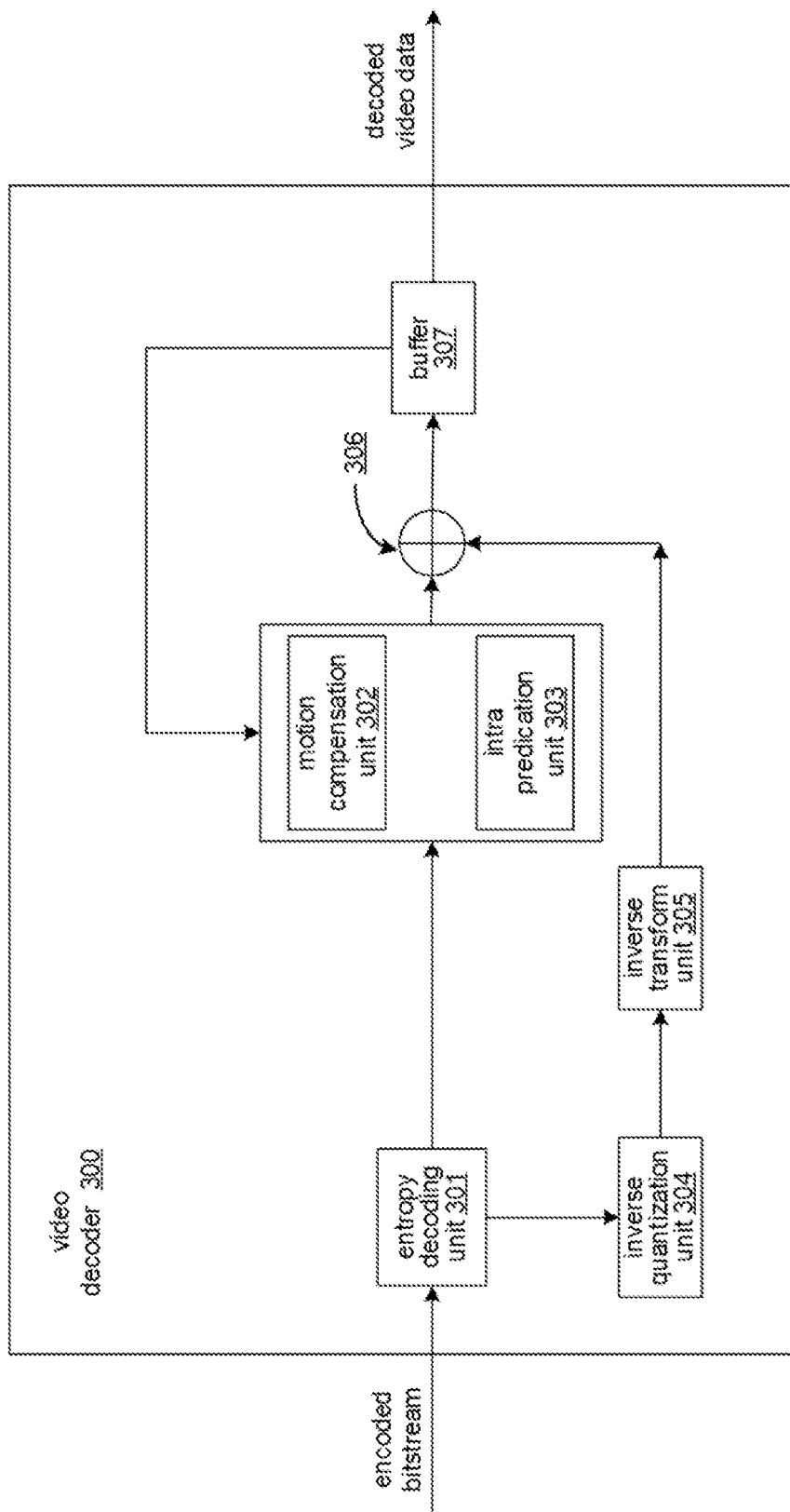
FIG. 6 is a block diagram that illustrates a decoder in accordance with some implementations of the disclosed technology.

FIG. 6 is a block diagram illustrating an example of video decoder 300 which may be video decoder 114 in the system 100 illustrated in FIG. 4.

The video decoder 300 may be configured to perform any or all of the techniques of this disclosure. In the example of FIG. 5, the video decoder 300 includes a plurality of functional components. The techniques described in this disclosure may be shared among the various components of the video decoder 300. In some examples, a processor may be configured to perform any or all of the techniques described in this disclosure.

In the example of FIG. 6, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 5).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 20 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may uses some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 202 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra predication and also produces decoded video for presentation on a display device.

A listing of solutions describes some embodiments of the disclosed technology.

A first set of solutions is provided below. The following solutions show example embodiments of techniques discussed in the previous section (e.g., items 1-3).

Figure 3:
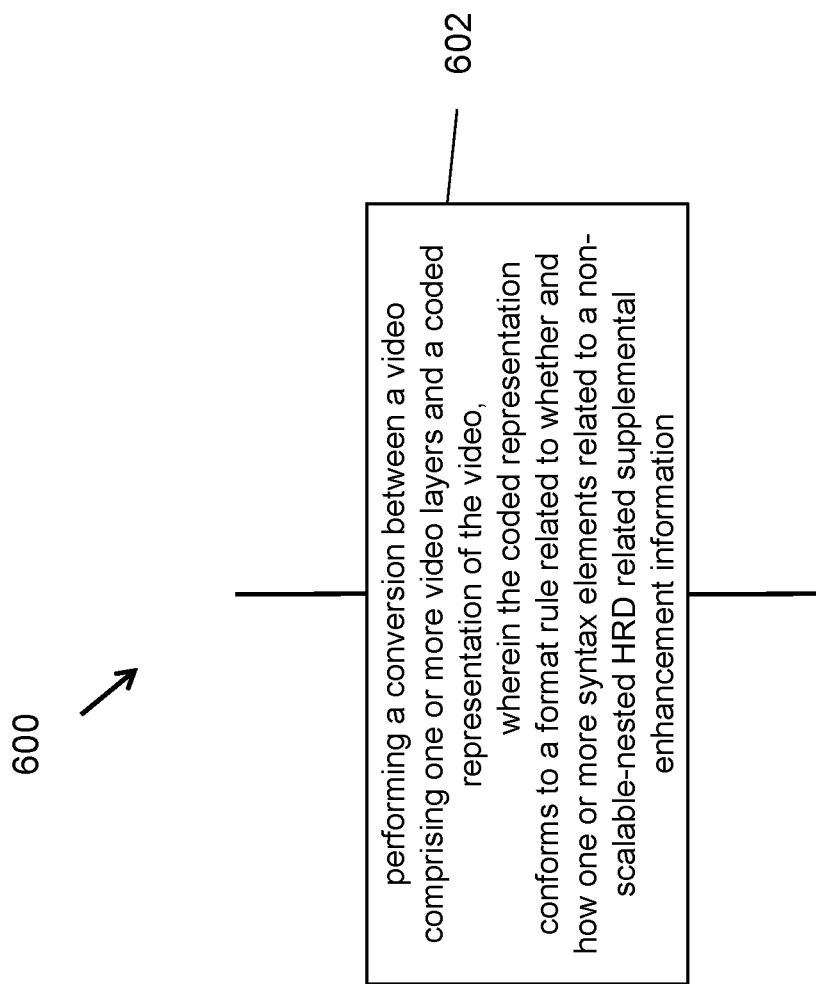
FIG. 3 is a flowchart for an example method of video processing.

1. A video processing method (e.g., method 600 shown in FIG. 3), comprising: performing (602) a conversion between a video comprising one or more video layers and a coded representation of the video comprising one or more output layer sets, wherein the coded representation conforms to a format rule related to whether and how one or more syntax elements related to a non-scalable-nested hypothetical reference decoder (HRD) related supplemental enhancement information (SEI).

2. The method of solution 1, wherein the format rule specifies that a message related to the non-scalable-nested HRD related SEI applies to output layer sets that include same set of layers as the entire coded representation.

3. The method of any of solutions 1-2, wherein the format rule specifies to omit the one or more syntax elements in case that there is no output layer set that has a same set of layers as the entire coded representation.

4. The method of solution 1, wherein the format rule specifies that the one or more syntax element are applicable to all layers in the coded representation.

The following solutions show example embodiments of techniques discussed in the previous section (e.g., items 4-10).

5. A video processing method, comprising: performing a conversion between a video comprising one or more video layers and a coded representation of the video comprising one or more output layer sets, wherein the coded representation conforms to a format rule related to whether and how one or more syntax elements are included in a supplemental enhancement information (SEI) network abstraction layer (NAL) unit.

6. The method of solution 5, wherein the format rule specifies that, in case that the SEI NAL unit includes a non-scalable-nested SEI message, a value of layer identifier is unconstrained.

7. The method of any of solutions 5-6, wherein the format rule disables inclusion of a SEI NAL unit that includes a scalable-nested SEI message of a certain payload type due to signaling of use of a same picture timing in all output layer sets of in the coded representation.

8. The method of any of solutions 5-7, wherein the format rule specifies that an SEI NAL unit that includes a non-scalable-nested SEI message of a first specific payload type is disallowed to include another SEI message of a second specific type.

9. The method of solution 8, wherein the first specific payload type is equal to 0, 1, 130 or 203.

10. The method of solutions 8 or 9, wherein the second specific payload type is equal to 0, 1, 130, 203, or 133.

11. The method of solutions 8 to 10, wherein first specific payload type and the second specific payload type are 3.

12. The method of any of solutions 1-11, wherein the performing the conversion comprises encoding the video to generate the coded representation.

13. The method of any of solutions 1-11, wherein the performing the conversion comprises parsing and decoding the coded representation to generate the video.

14. A video decoding apparatus comprising a processor configured to implement a method recited in one or more of solutions 1 to 13.

15. A video encoding apparatus comprising a processor configured to implement a method recited in one or more of solutions 1 to 13.

16. A computer program product having computer code stored thereon, the code, when executed by a processor, causes the processor to implement a method recited in any of solutions 1 to 13.

17. A method, apparatus or system described in the present document.

A second set of solutions show example embodiments of techniques discussed in the previous section (e.g., items 1-5).

Figure 7A:
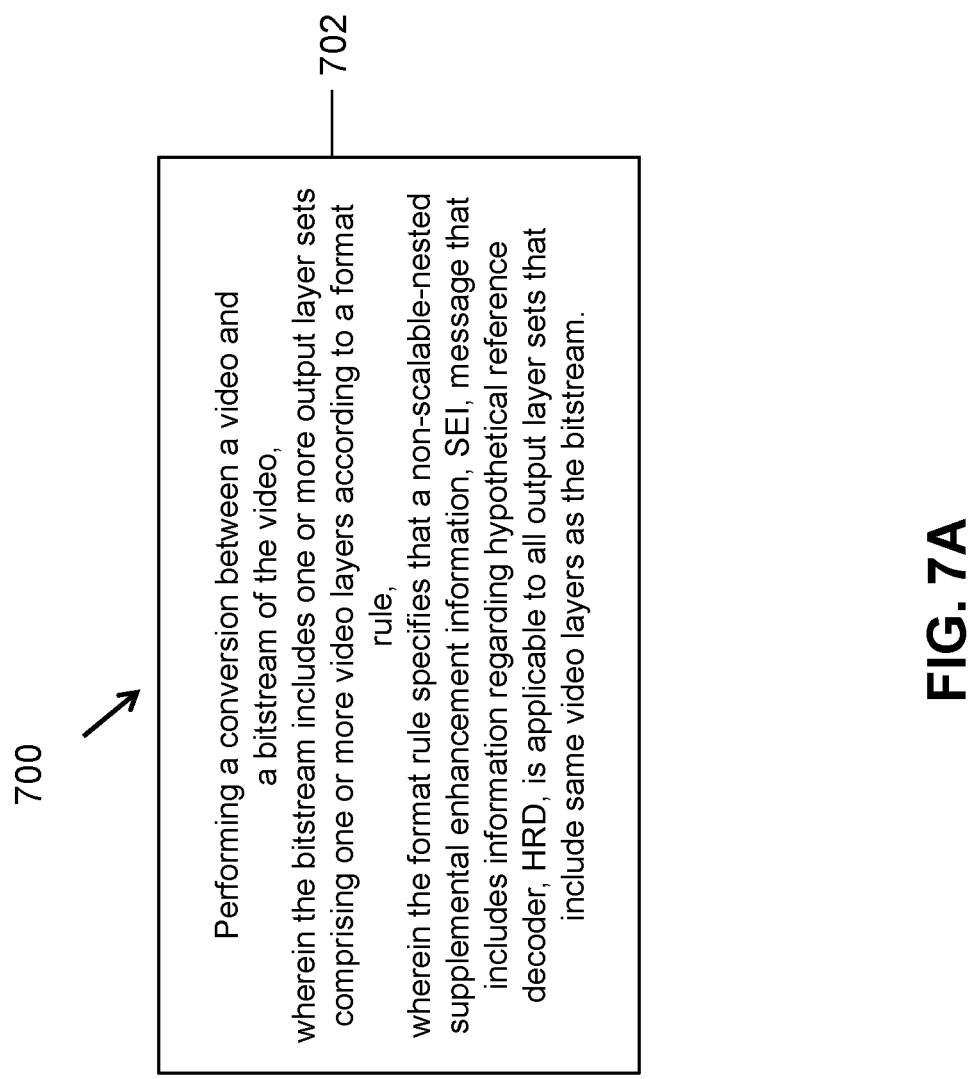

1. A method of processing video data (e.g., method 700 as shown in FIG. 7A), comprising: performing 702 a conversion between a video and a bitstream of the video, wherein the bitstream includes one or more output layer sets comprising one or more video layers according to a format rule, wherein the format rule specifies that a non-scalable-nested supplemental enhancement information, SEI, message that includes information regarding hypothetical reference decoder, HRD, is applicable to all output layer sets that include same video layers as the bitstream.

2. The method of solution 1, wherein the non-scalable-nested SEI message is an SEI message that is not contained in a scalable nesting SEI message.

3. The method of solution 1 or 2, wherein the non-scalable-nested SEI message that includes information regarding the HRD is a buffering period (BP) SEI message, a picture timing (PT) SEI message, a decoding unit information (DUI) SEI message, or a subpicture level information (SLI) SEI message.

4. The method of solution 1 or 2, wherein the non-scalable-nested SEI message that includes information regarding the HRD has a payload type that is equal to 0, 1, 130, or 203.

Figure 7B:
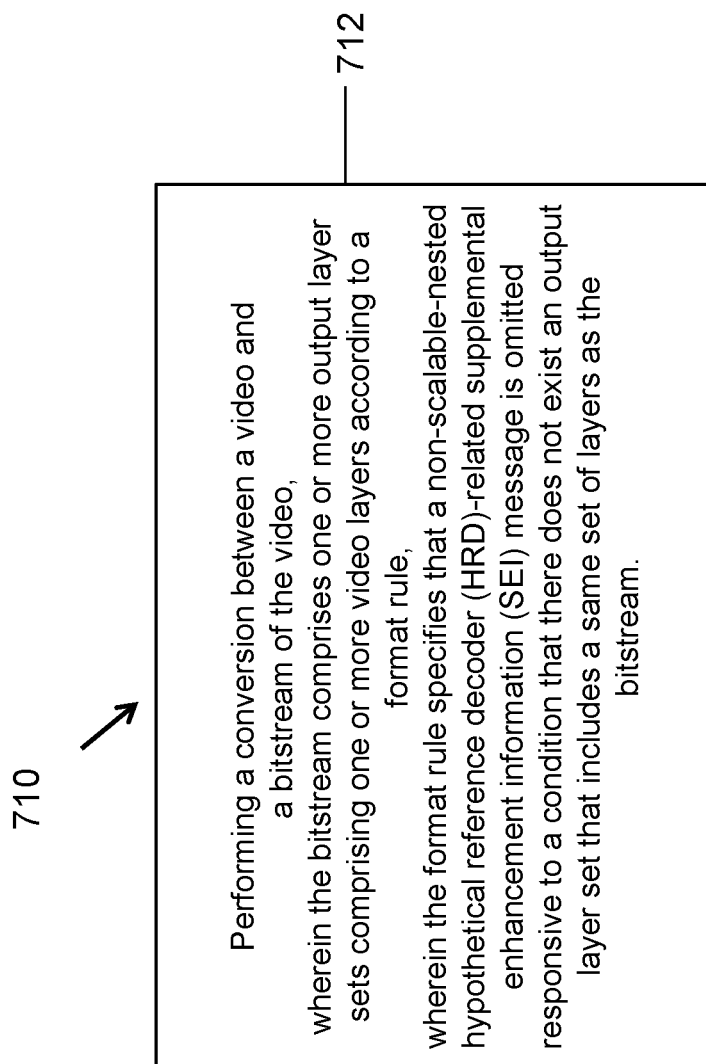

5. A method of processing video data (e.g., method 710 as shown in FIG. 7B), comprising: performing 712 a conversion between a video and a bitstream of the video, wherein the bitstream comprises one or more output layer sets comprising one or more video layers according to a format rule, wherein the format rule specifies that a non-scalable-nested hypothetical reference decoder (HRD)-related supplemental enhancement information (SEI) message is omitted responsive to a condition that there does not exist an output layer set that includes a same set of layers as the bitstream.

6. The method of solution 5, wherein the non-scalable-nested SEI message is an SEI message that is not contained in a scalable nesting SEI message.

7. The method of solution 5 or 6, wherein the non-scalable-nested HRD-related SEI message is a buffering period (BP) SEI message, a picture timing (PT) SEI message, a decoding unit information (DUI) SEI message, or a subpicture level information (SLI) SEI message.

8. The method of solution 5 or 6, wherein the non-scalable-nested HRD-related SEI message has a payload type that is equal to 0, 1, 130, or 203.

Figure 7C:
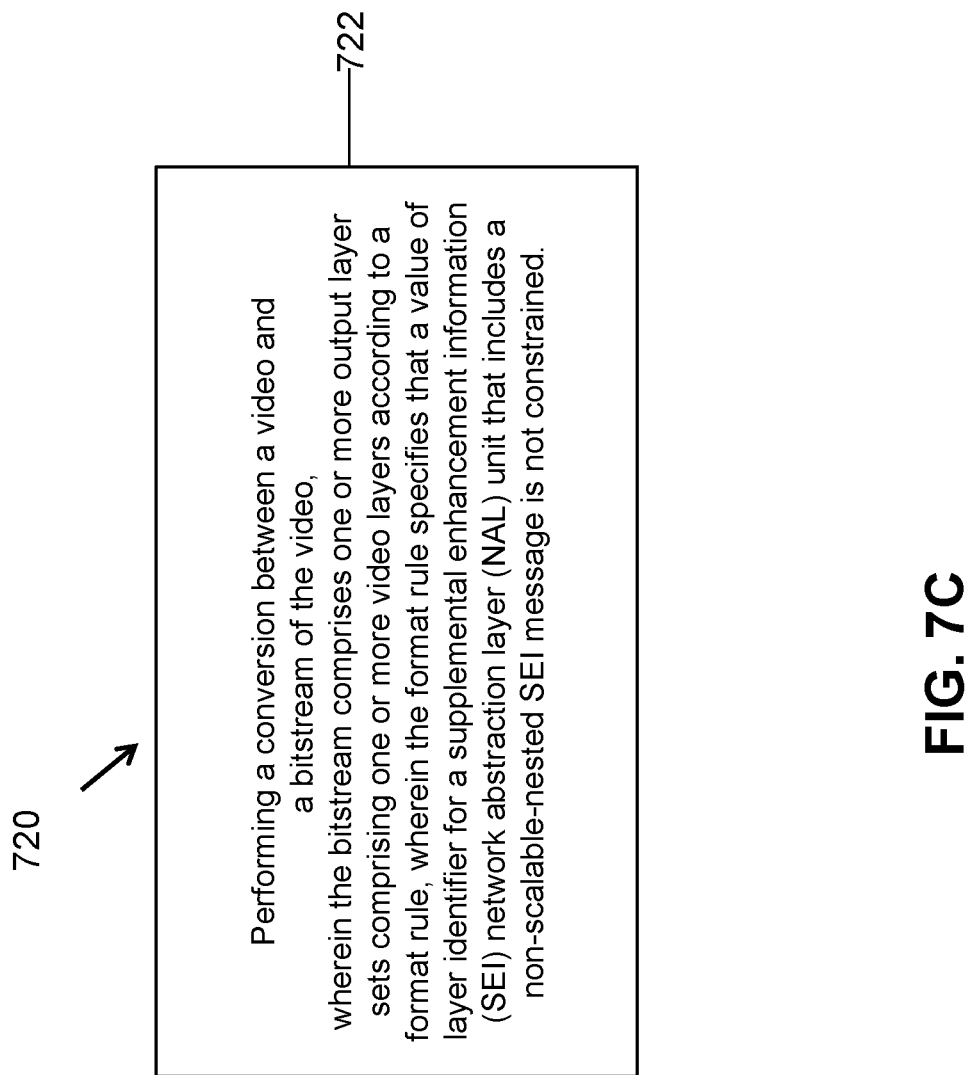
Figure 7E:
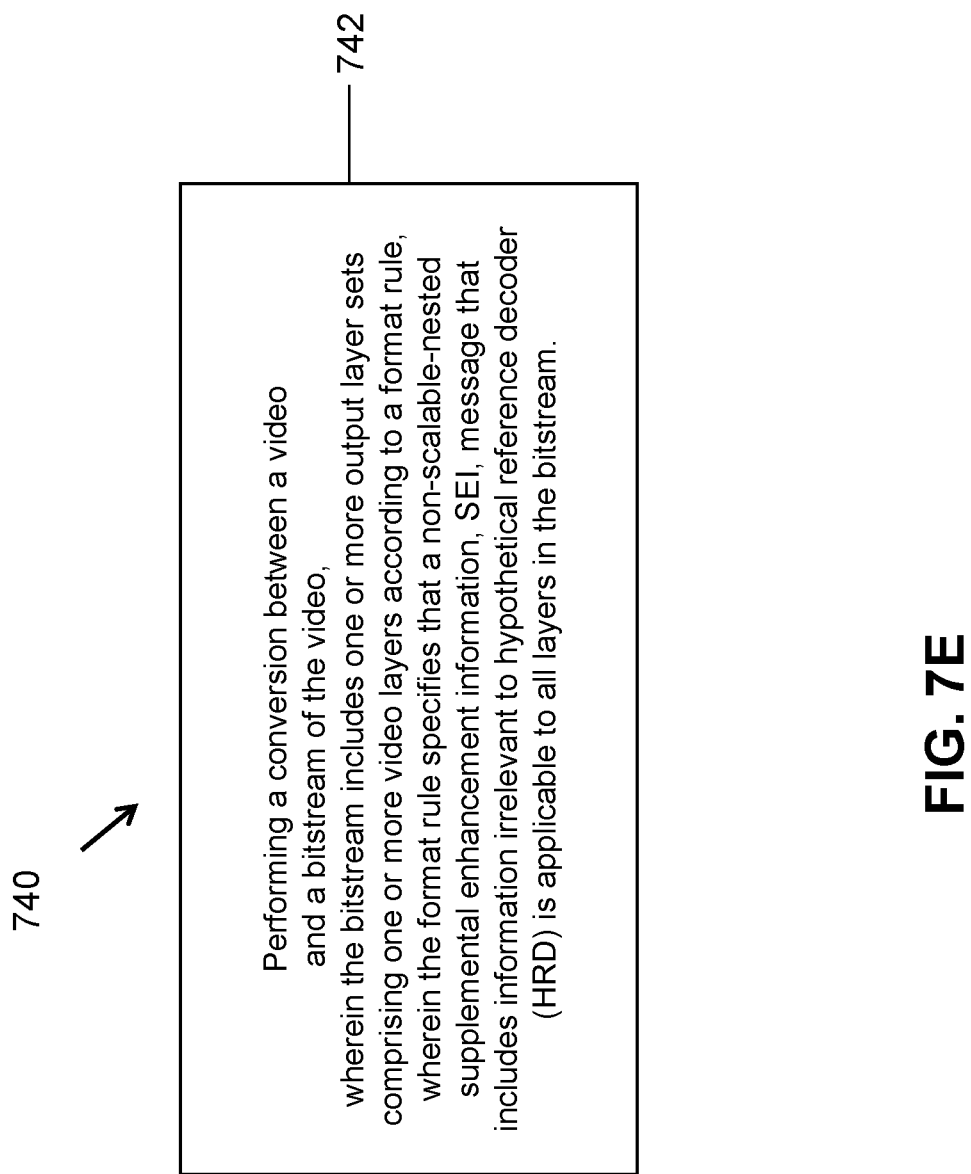

9. A method of processing video data (e.g., method 720 as shown in FIG. 7C), comprising: performing 722 a conversion between a video and a bitstream of the video, wherein the bitstream comprises one or more output layer sets comprising one or more video layers according to a format rule, wherein the format rule specifies that a value of layer identifier for a supplemental enhancement information (SEI) network abstraction layer (NAL) unit that includes a non-scalable-nested SEI message is not constrained.

10. The method of solution 9, wherein the non-scalable-nested SEI message is an SEI message that is not contained in a scalable nesting SEI message.

11. The method of solution 9, wherein the non-scalable-nested SEI message is a buffering period (BP) SEI message, a picture timing (PT) SEI message, a decoding unit information (DUI) SEI message, or a subpicture level information (SLI) SEI message.

12. The method of solution 9, wherein the non-scalable-nested SEI message has a payload type that is equal to 0, 1, 130 or 203.

13. A method of processing video data (e.g., method 730 as shown in FIG. 7D), comprising: performing 732 a conversion between a video and a bitstream of the video, wherein the bitstream comprises one or more output layer sets comprising one or more video layers according to a format rule, wherein the format rule specifies that a particular payload type value corresponding to subpicture level information is disallowed from a list that includes allowable supplemental enhancement information (SEI) payload type values for non-hypothetical reference decoder (HRD) related supplemental enhancement information (SEI) messages.

14. The method of solution 13, wherein the particular payload type value is 203.

15. The method of solution 13, wherein the allowable SEI payload type values include filler payload, film grain characteristics, frame packing arrangement, parameter sets inclusion indication, mastering display color volume, content light level information, dependent rap indication, alternative transfer characteristics, ambient viewing environment, content color volume, equirectangular projection, generalized cube map projection, sphere rotation, region-wise packing, omni viewport, frame field information and sample aspect ratio information.

16. The method of solution 13, wherein the allowable SEI payload type values include 3, 19, 45, 129, 137, 144, 145, 147 to 150, 153 to 156, 168, and 204.

17. A method of processing video data, comprising: performing a conversion between a video and a bitstream of the video, wherein the bitstream includes one or more output layer sets comprising one or more video layers according to a format rule, wherein the format rule specifies that a non-scalable-nested supplemental enhancement information, SEI, message that includes information irrelevant to hypothetical reference decoder (HRD) is applicable to all layers in the bitstream.

18. The method of solution 17, wherein the non-scalable-nested SEI message is an SEI message that is not contained in a scalable nesting SEI message.

19. The method of solution 17 or 18, wherein the non-scalable-nested SEI message that includes information irrelevant to the HRD has a payload type that is not equal to 0, 1, 130, or 203.

20. The method of solution 17 or 18, wherein the non-scalable-nested SEI message that includes information irrelevant to the HRD does not correspond to a buffering period (BP) SEI message, a picture timing (PT) SEI message, a decoding unit information (DUI) SEI message, or a subpicture level information (SLI) SEI message.

21. The method of any of solutions 1 to 20, wherein the conversion includes encoding the video into the bitstream.

22. The method of any of solutions 1 to 20, wherein the conversion includes decoding the video from the bitstream.

23. The method of any of solutions 1 to 20, wherein the conversion includes generating the bitstream from the video, and the method further comprises: storing the bitstream in a non-transitory computer-readable recording medium.

24. A video processing apparatus comprising a processor configured to implement a method recited in any one or more of solutions 1 to 23.

25. A method of storing a bitstream of a video, comprising, a method recited in any one of solutions 1 to 23, and further including storing the bitstream to a non-transitory computer-readable recording medium.

26. A computer readable medium storing program code that, when executed, causes a processor to implement a method recited in any one or more of solutions 1 to 23.

27. A computer readable medium that stores a bitstream generated according to any of the above described methods.

28. A video processing apparatus for storing a bitstream, wherein the video processing apparatus is configured to implement a method recited in any one or more of solutions 1 to 23.

A third set of solutions show example embodiments of techniques discussed in the previous section (e.g., item 6).

Figure 8:
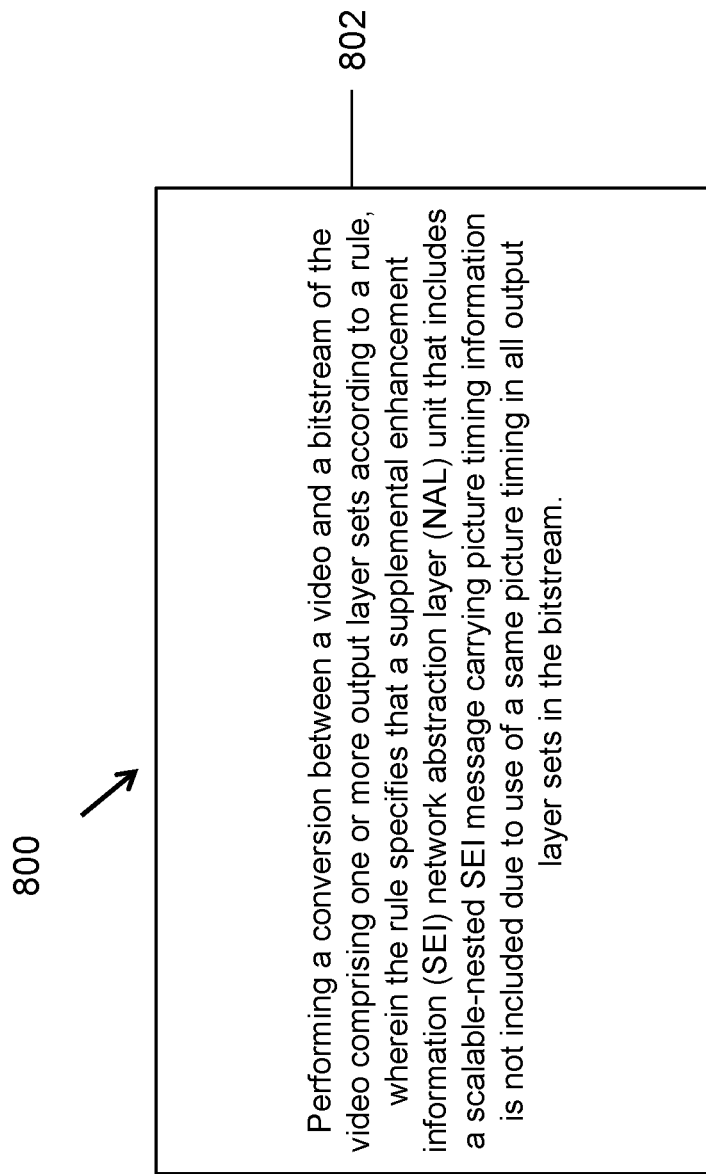
FIG. 8 is a flowchart for an example method of video processing based on some implementations of the disclosed technology.

1. A method of processing video data (e.g., method 800 as shown in FIG. 8), comprising: performing 802 a conversion between a video and a bitstream of the video comprising one or more output layer sets according to a rule, wherein the rule specifies that a supplemental enhancement information (SEI) network abstraction layer (NAL) unit that includes a scalable-nested SEI message carrying picture timing information is not included due to use of a same picture timing in all output layer sets in the bitstream.

2. The method of solution 1, wherein the scalable-nested SEI message is an SEI message that is contained in a scalable nesting SEI message.

3. The method of solution 1 or 2, wherein the scalable-nested SEI message carrying the picture timing information corresponds to a picture timing (PT) SEI message.

4. The method of solution 1, wherein the scalable-nested SEI message carrying the picture timing information has a payload type equal to 1.

5. The method of any of solutions 1 to 4, wherein the rule further specifies that non-scalable-nested SEI messages carrying the picture timing information apply to the all output layer sets and subpicture sequences that are allowed to be extracted from the bitstream.

6. The method of solution 5, wherein a non-scalable-nested SEI message is an SEI message that is not contained in a scalable nesting SEI message.

7. The method of any of solutions 1 to 4, wherein the rule further specifies that the SEI NAL unit that includes the scalable-nested SEI message carrying the picture timing information is not included in case that a syntax field has a value specifying that the scalable-nested SEI message that applies to specific output layer sets or layers applies to all subpictures of the specified output layer sets or layers.

8. The method of any of solutions 1 to 7, wherein the conversion includes encoding the video into the bitstream.

9. The method of any of solutions 1 to 7, wherein the conversion includes decoding the video from the bitstream.

10. The method of any of solutions 1 to 7, wherein the conversion includes generating the bitstream from the video, and the method further comprises: storing the bitstream in a non-transitory computer-readable recording medium.

11. A video processing apparatus comprising a processor configured to implement a method recited in any one or more of solutions 1 to 10.

12. A method of storing a bitstream of a video, comprising, a method recited in any one of solutions 1 to 10, and further including storing the bitstream to a non-transitory computer-readable recording medium.

13. A computer readable medium storing program code that, when executed, causes a processor to implement a method recited in any one or more of solutions 1 to 10.

14. A computer readable medium that stores a bitstream generated according to any of the above described methods.

15. A video processing apparatus for storing a bitstream, wherein the video processing apparatus is configured to implement a method recited in any one or more of solutions 1 to 10.

A fourth set of solutions show example embodiments of techniques discussed in the previous section (e.g., items 7-9).

Figure 9A:
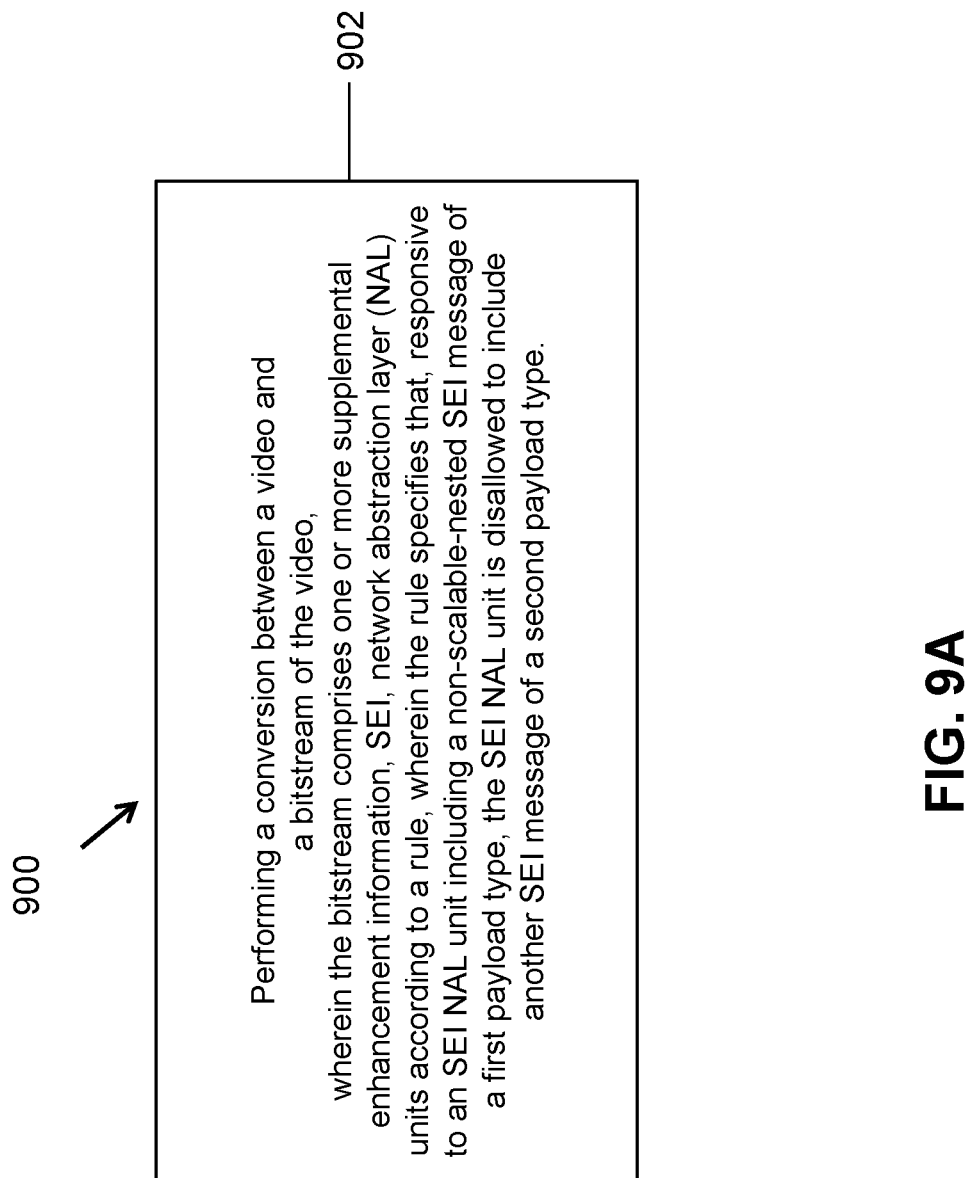
FIGS. 9A to 9C are flowcharts for example methods of video processing based on some implementations of the disclosed technology.

1. A method of processing video data (e.g., method 900 as shown in FIG. 9A), comprising: performing 902 a conversion between a video and a bitstream of the video, wherein the bitstream comprises one or more supplemental enhancement information, SEI, network abstraction layer (NAL) units according to a rule, wherein the rule specifies that, responsive to an SEI NAL unit including a non-scalable-nested SEI message of a first payload type, the SEI NAL unit is disallowed to include another SEI message of a second payload type.

2. The method of solution 1, wherein the non-scalable-nested SEI message is an SEI message that is not contained in a scalable nesting SEI message.

3. The method of solution 1 or 2, wherein the non-scalable-nested SEI message of the first payload type corresponds to a buffering period (BP) SEI message, a picture timing (PT) SEI message, a decoding unit information (DUI) SEI message, or a subpicture level information (SLI) SEI message.

4. The method of solution 1 or 2, wherein the first payload type is equal to 0, 1, 130 or 203.

5. The method of any of solutions 1 to 4, wherein the non-scalable-nested SEI message of the second payload type does not correspond to any of a buffering period (BP) SEI message, a picture timing (PT) SEI message, a decoding unit information (DUI) SEI message, and a subpicture level information (SLI) SEI message.

6. The method of any of solutions 1 to 4, wherein the second payload type is not equal to any of 0, 1, 130 and 203.

Figure 9B:
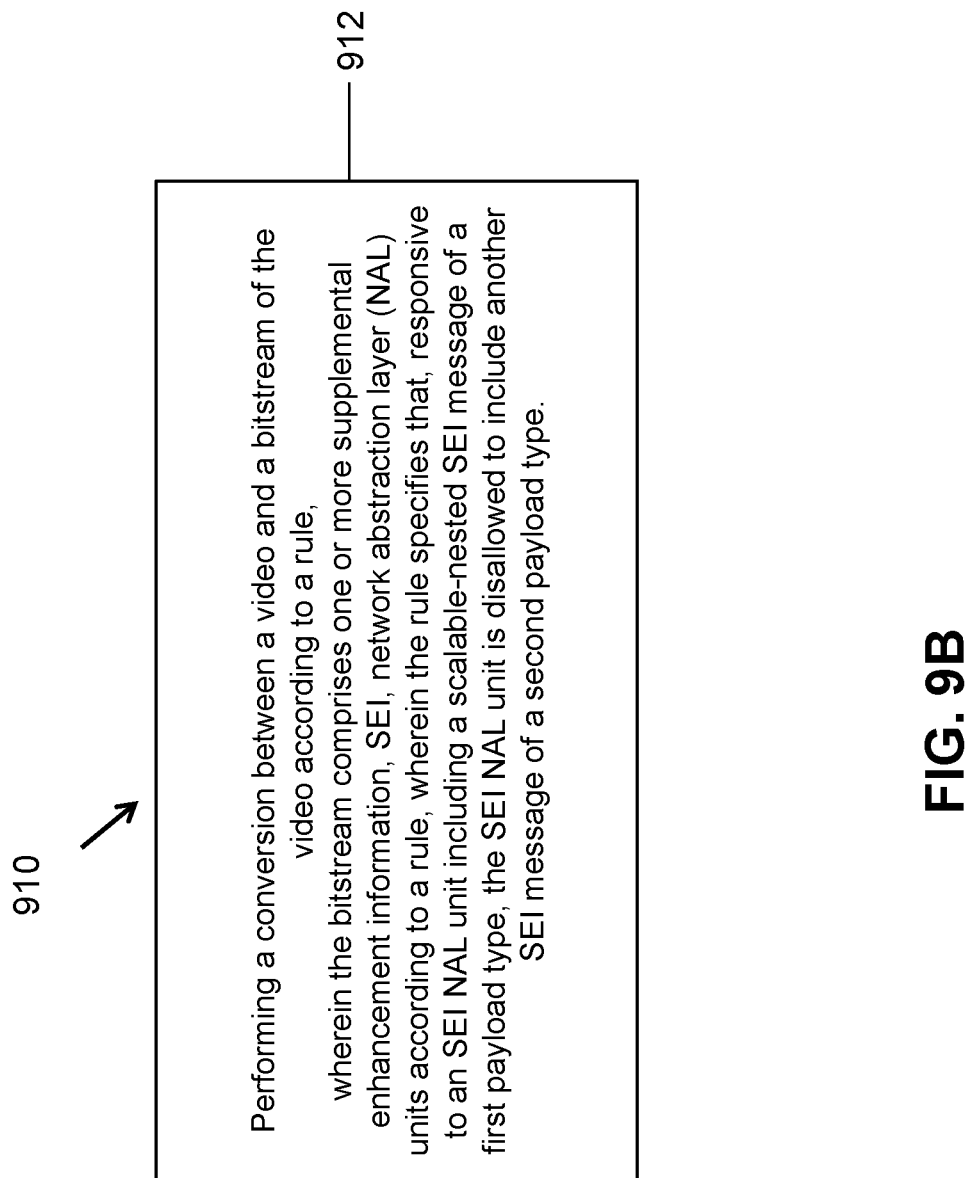

7. A method of processing video data (e.g., method 910 as shown in FIG. 9B), comprising: performing 912 a conversion between a video and a bitstream of the video according to a rule, wherein the bitstream comprises one or more supplemental enhancement information, SEI, network abstraction layer (NAL) units according to a rule, wherein the rule specifies that, responsive to an SEI NAL unit including a scalable-nested SEI message of a first payload type, the SEI NAL unit is disallowed to include another SEI message of a second payload type.

8. The method of solution 7, wherein the scalable-nested SEI message is an SEI message that is contained in a scalable nesting SEI message.

9. The method of solution 7 or 8, wherein the scalable-nested SEI message of the first payload type corresponds to a buffering period (BP) SEI message, a picture timing (PT) SEI message, a decoding unit information (DUI) SEI message, or a subpicture level information (SLI) SEI message.

10. The method of solution 7 or 8, wherein the first payload type is equal to 0, 1, 130 or 203.

11. The method of any of solutions 7 to 10, wherein the scalable-nested SEI message of the second payload type does not correspond to any of a buffering period (BP) SEI message, a picture timing (PT) SEI message, a decoding unit information (DUI) SEI message, a subpicture level information (SLI) SEI message, and a scalable nesting information SEI message.

12. The method of any of solutions 7 to 10, wherein the second payload type is not equal to any of 0, 1, 130, 203, and 133.

Figure 9C:
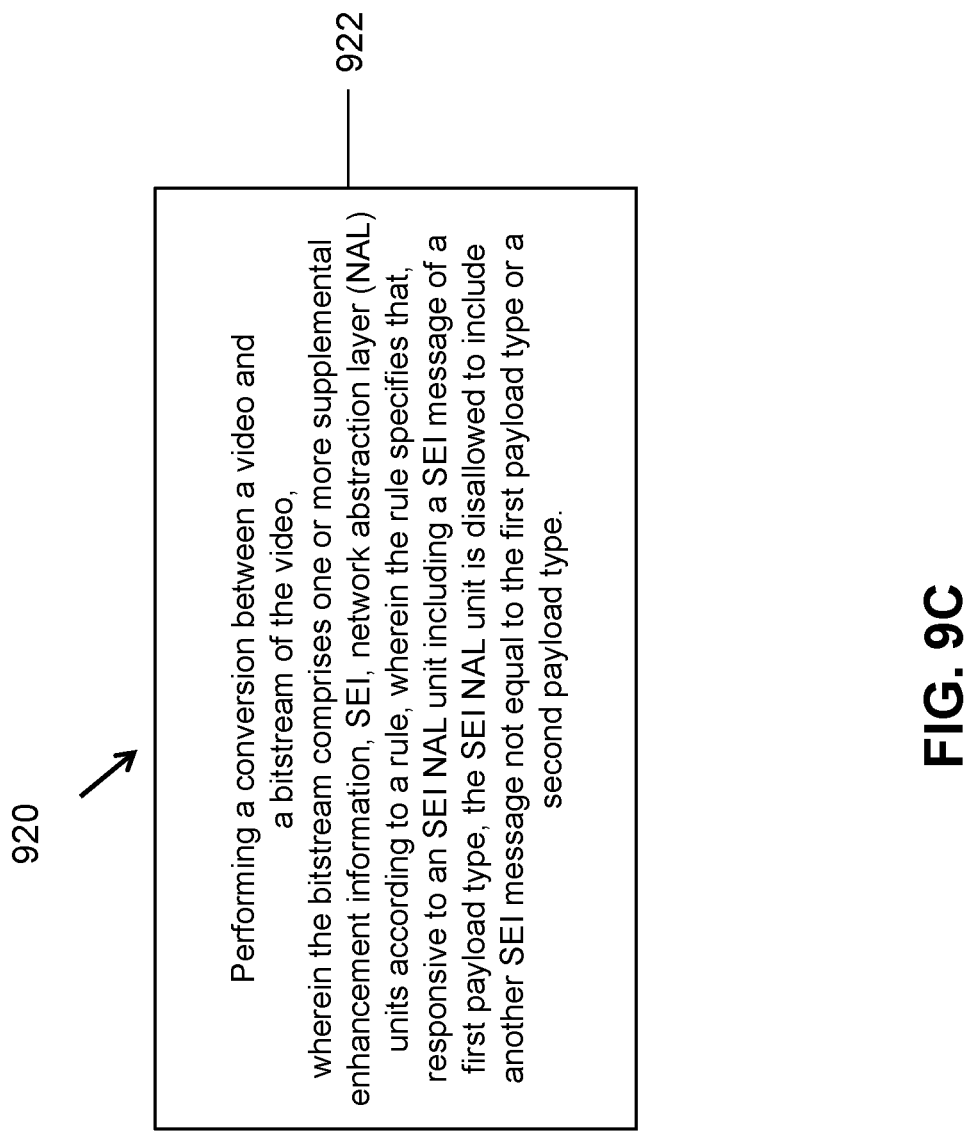

13. A method of processing video data (e.g., method 920 as shown in FIG. 9C), comprising: performing 922 a conversion between a video and a bitstream of the video, wherein the bitstream comprises one or more supplemental enhancement information, SEI, network abstraction layer (NAL) units according to a rule, wherein the rule specifies that, responsive to an SEI NAL unit including a SEI message of a first payload type, the SEI NAL unit is disallowed to include another SEI message not equal to the first payload type or a second payload type.

14. The method of solution 13, wherein the SEI message of the first payload type corresponds to a filler payload SEI message.

15. The method of solution 13 or 14, wherein the first payload type is equal to 3.

16. The method of any of solutions 13 to 15, wherein the rule further specifies that the SEI message of the first payload type is disallowed to be contained in a scalable nesting SEI message.

17. The method of any of solutions 13 to 16, wherein the rule further specifies that the SEI message of the second payload type is a scalable nesting SEI message.

18. The method of any of solutions 13 to 16, wherein the second payload type is equal to 133.

19. The method of any of solutions 1 to 18, wherein the conversion includes encoding the video into the bitstream.

20. The method of any of solutions 1 to 18, wherein the conversion includes decoding the video from the bitstream.

21. The method of any of solutions 1 to 18, wherein the conversion includes generating the bitstream from the video, and the method further comprises: storing the bitstream in a non-transitory computer-readable recording medium.

22. A video processing apparatus comprising a processor configured to implement a method recited in any one or more of solutions 1 to 21.

23. A method of storing a bitstream of a video, comprising, a method recited in any one of solutions 1 to 21, and further including storing the bitstream to a non-transitory computer-readable recording medium.

24. A computer readable medium storing program code that, when executed, causes a processor to implement a method recited in any one or more of solutions 1 to 21.

25. A computer readable medium that stores a bitstream generated according to any of the above described methods.

26. A video processing apparatus for storing a bitstream, wherein the video processing apparatus is configured to implement a method recited in any one or more of solutions 1 to 21.

A fifth set of solutions show example embodiments of techniques discussed in the previous section (e.g., items 10 and 11).

Figure 10A:
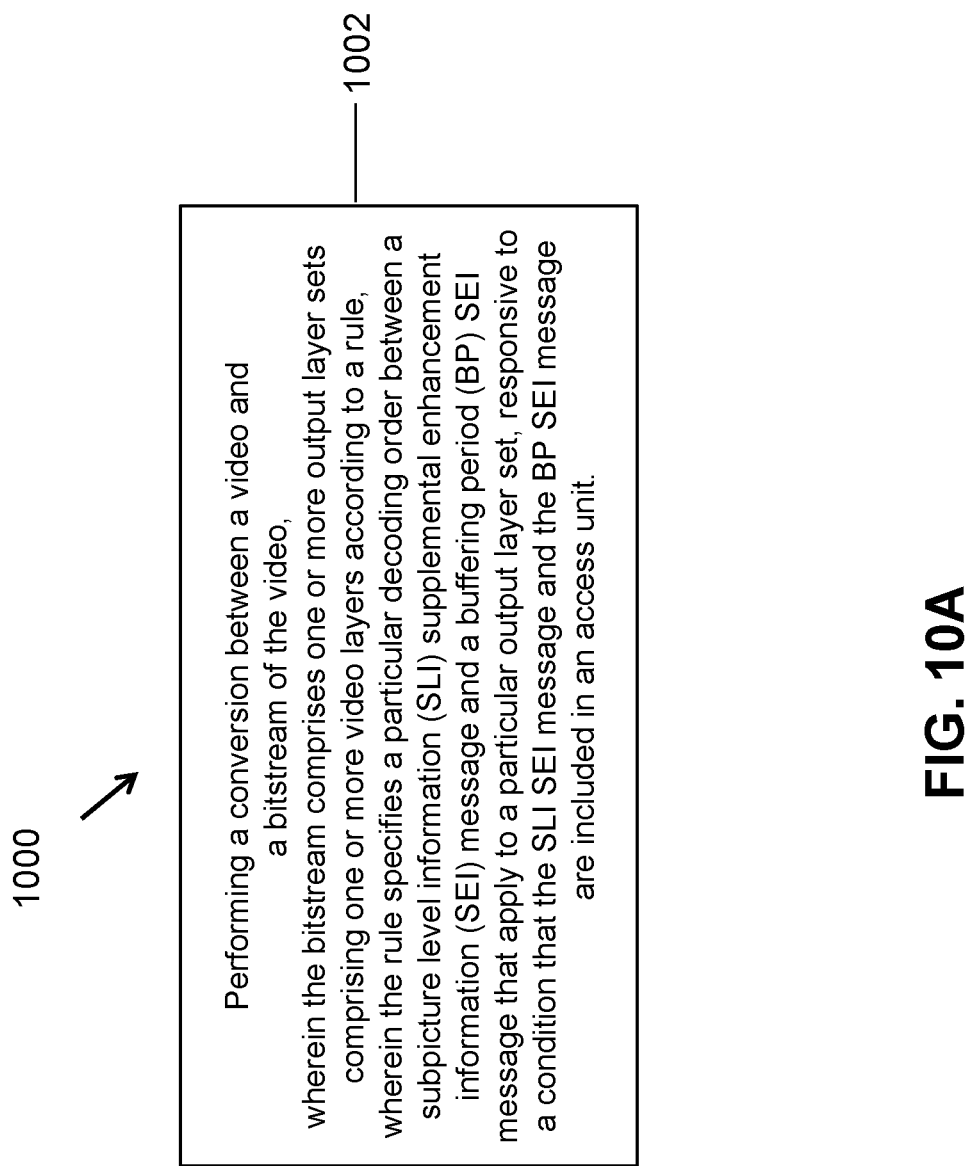

1. A method of processing video data (e.g., method 1000 as shown in FIG. 10A), comprising: performing 1002 a conversion between a video and a bitstream of the video, wherein the bitstream comprises one or more output layer sets comprising one or more video layers according to a rule, wherein the rule specifies a particular decoding order between a subpicture level information (SLI) supplemental enhancement information (SEI) message and a buffering period (BP) SEI message that apply to a particular output layer set, responsive to a condition that the SLI SEI message and the BP SEI message are included in an access unit.

2. The method of solution 1, wherein the particular decoding order is that the SLI SEI message precedes the BP SEI message.

3. A method of processing video data (e.g., method 1010 as shown in FIG. 10B), comprising: performing 1012 a conversion between a video and a bitstream of the video according to a rule, wherein the rule specifies that a first syntax field indicating sublayer representation information for which an initial coded picture buffer (CPB) removal delay related syntax elements are present is omitted, responsive to a particular value of a second syntax field indicative of a maximum number of temporal sublayers for which an initial CPB removal delay is indicated in a buffering period supplemental enhancement information (SEI) message.

4. The method of solution 3, wherein the particular value is 0.

5. The method of solution 3 or 4, wherein the second syntax filed with the particular value specifies that the maximum number of temporal sublayers is 1.

6. The method of any of solutions 3 to 5, wherein the first syntax field equal to another particular value specifies that the initial CPB removal delay related syntax elements are present for the sublayer representation in a range of 0 to the second syntax field, inclusive.

7. The method of solution 6, wherein another particular value is 1.

8. The method of any of solutions 3 to 7, wherein the syntax filed equal to another particular value specifies that the initial CPB removal delay related syntax elements are present for the sublayer representation corresponding to the particular value of the second syntax field.

9. The method of solution 8, wherein the another particular value is 0.

10. The method of any of solutions 3 to 9, wherein the rule further specifies to infer a value of the first syntax field to be equal to 0, responsive to the particular value of the second syntax field.

11. The method of any of solutions 1 to 10, wherein the conversion includes encoding the video into the bitstream.

12. The method of any of solutions 1 to 10, wherein the conversion includes decoding the video from the bitstream.

13. The method of any of solutions 1 to 10, wherein the conversion includes generating the bitstream from the video, and the method further comprises: storing the bitstream in a non-transitory computer-readable recording medium.

14. A video processing apparatus comprising a processor configured to implement a method recited in any one or more of solutions 1 to 13.

15. A method of storing a bitstream of a video, comprising, a method recited in any one of solutions 1 to 13, and further including storing the bitstream to a non-transitory computer-readable recording medium.

16. A computer readable medium storing program code that, when executed, causes a processor to implement a method recited in any one or more of solutions 1 to 13.

17. A computer readable medium that stores a bitstream generated according to any of the above described methods.

18. A video processing apparatus for storing a bitstream, wherein the video processing apparatus is configured to implement a method recited in any one or more of solutions 1 to 13.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of processing video data, comprising:
performing a conversion between a video and a bitstream of the video,
wherein the bitstream comprises one or more supplemental enhancement information (SEI) network abstraction layer (NAL) units according to a rule,
wherein the rule specifies that, when an SEI NAL unit contains a non-scalable-nested SEI message of a first payload type, the SEI NAL unit is disallowed to contain another SEI message of a second payload type,
wherein the rule further specifies that, when an SEI NAL unit contains a scalable-nested SEI message of a third payload type, the SEI NAL unit is disallowed to contain another SEI message of a fourth payload type, and
wherein the non-scalable-nested SEI message of the first payload type corresponds to a buffering period (BP) SEI message, a picture timing (PT) SEI message, a decoding unit information (DUI) SEI message, or a subpicture level information (SLI) SEI message,
wherein the first payload type is equal to 0, 1, 130 or 203,
wherein the SEI message of the second payload type corresponds to any of a buffering period (BP) SEI message, a picture timing (PT) SEI message, a decoding unit information (DUI) SEI message, and a subpicture level information (SLI) SEI message,
wherein the second payload type is not equal to any of 0, 1, 130 and 203,
wherein the scalable-nested SEI message of the third payload type corresponds to a buffering period (BP) SEI message, a picture timing (PT) SEI message, a decoding unit information (DUI) SEI message, or a subpicture level information (SLI) SEI message,
wherein the third payload type is equal to 0, 1, 130 or 203,
wherein the scalable-nested SEI message of the fourth payload type corresponds to any of a buffering period (BP) SEI message, a picture timing (PT) SEI message, a decoding unit information (DUI) SEI message, a subpicture level information (SLI) SEI message, and a scalable nesting SEI message,
wherein the fourth payload type is not equal to any of 0, 1, 130, 203, and 133,
wherein the third payload type is not the same as the fourth payload type,
wherein the rule further specifies that, when an SEI NAL unit contains an SEI message with a payload type of filler payload, the SEI NAL unit is disallowed to contain any other SEI message with a payload type not equal to filler payload, and
wherein the rule further specifies that, an SEI message that has a payload type of filler payload is disallowed to be contained in a scalable nesting SEI message.

2. The method of claim 1, wherein the conversion includes encoding the video into the bitstream.

3. The method of claim 1, wherein the conversion includes decoding the video from the bitstream.

4. An apparatus for processing video data comprising a processor and a non-transitory memory with instructions thereon, wherein the instructions upon execution by the processor, cause the processor to:
perform a conversion between a video and a bitstream of the video,
wherein the bitstream comprises one or more supplemental enhancement information (SEI) network abstraction layer (NAL) units according to a rule,
wherein the rule specifies that, when an SEI NAL unit contains a non-scalable-nested SEI message of a first payload type, the SEI NAL unit is disallowed to contain another SEI message of a second payload type, wherein the rule further specifies that, when an SEI NAL unit contains a scalable-nested SEI message of a third payload type, the SEI NAL unit is disallowed to contain another SEI message of a fourth payload type, and wherein the non-scalable-nested SEI message of the first payload type corresponds to a buffering period (BP) SEI message, a picture timing (PT) SEI message, a decoding unit information (DUI) SEI message, or a subpicture level information (SLI) SEI message, wherein the first payload type is equal to 0, 1, 130 or 203, wherein the SEI message of the second payload type corresponds to any of a buffering period (BP) SEI message, a picture timing (PT) SEI message, a decoding unit information (DUI) SEI message, and a subpicture level information (SLI) SEI message, wherein the second payload type is not equal to any of 0, 1, 130 and 203, wherein the scalable-nested SEI message of the third payload type corresponds to a buffering period (BP) SEI message, a picture timing (PT) SEI message, a decoding unit information (DUI) SEI message, or a subpicture level information (SLI) SEI message, wherein the third payload type is equal to 0, 1, 130 or 203, wherein the scalable-nested SEI message of the fourth payload type corresponds to any of a buffering period (BP) SEI message, a picture timing (PT) SEI message, a decoding unit information (DUI) SEI message, a subpicture level information (SLI) SEI message, and a scalable nesting SEI message, wherein the fourth payload type is not equal to any of 0, 1, 130, 203, and 133, wherein the third payload type is not the same as the fourth payload type, wherein the rule further specifies that, when an SEI NAL unit contains an SEI message with a payload type of filler payload, the SEI NAL unit is disallowed to contain any other SEI message with a payload type not equal to filler payload, and wherein the rule further specifies that, an SEI message that has a payload type of filler payload is disallowed to be contained in a scalable nesting SEI message.

5. A non-transitory computer-readable storage medium storing instructions that cause a processor to:

perform a conversion between a video and a bitstream of the video, wherein the bitstream comprises one or more supplemental enhancement information (SEI) network abstraction layer (NAL) units according to a rule, wherein the rule specifies that, when an SEI NAL unit contains a non-scalable-nested SEI message of a first payload type, the SEI NAL unit is disallowed to contain another SEI message of a second payload type, wherein the rule further specifies that, when an SEI NAL unit contains a scalable-nested SEI message of a third payload type, the SEI NAL unit is disallowed to contain another SEI message of a fourth payload type, and wherein the non-scalable-nested SEI message of the first payload type corresponds to a buffering period (BP) SEI message, a picture timing (PT) SEI message, a decoding unit information (DUI) SEI message, or a subpicture level information (SLI) SEI message, wherein the first payload type is equal to 0, 1, 130 or 203, wherein the SEI message of the second payload type corresponds to any of a buffering period (BP) SEI message, a picture timing (PT) SEI message, a decoding unit information (DUI) SEI message, and a subpicture level information (SLI) SEI message, wherein the second payload type is not equal to any of 0, 1, 130 and 203, wherein the scalable-nested SEI message of the third payload type corresponds to a buffering period (BP) SEI message, a picture timing (PT) SEI message, a decoding unit information (DUI) SEI message, or a subpicture level information (SLI) SEI message, wherein the third payload type is equal to 0, 1, 130 or 203, wherein the scalable-nested SEI message of the fourth payload type corresponds to any of a buffering period (BP) SEI message, a picture timing (PT) SEI message, a decoding unit information (DUI) SEI message, a subpicture level information (SLI) SEI message, and a scalable nesting SEI message, wherein the fourth payload type is not equal to any of 0, 1, 130, 203, and 133, wherein the third payload type is not the same as the fourth payload type, wherein the rule further specifies that, when an SEI NAL unit contains an SEI message with a payload type of filler payload, the SEI NAL unit is disallowed to contain any other SEI message with a payload type not equal to filler payload, and wherein the rule further specifies that, an SEI message that has a payload type of filler payload is disallowed to be contained in a scalable nesting SEI message.

6. A non-transitory computer-readable recording medium storing a bitstream of a video which is generated by a method performed by a video processing apparatus, wherein the method comprises:

generating the bitstream of the video, wherein the bitstream comprises one or more supplemental enhancement information (SEI) network abstraction layer (NAL) units according to a rule, wherein the rule specifies that, when an SEI NAL unit contains a non-scalable-nested SEI message of a first payload type, the SEI NAL unit is disallowed to contain another SEI message of a second payload type, wherein the rule further specifies that, when an SEI NAL unit contains a scalable-nested SEI message of a third payload type, the SEI NAL unit is disallowed to contain another SEI message of a fourth payload type, and wherein the non-scalable-nested SEI message of the first payload type corresponds to a buffering period (BP) SEI message, a picture timing (PT) SEI message, a decoding unit information (DUI) SEI message, or a subpicture level information (SLI) SEI message, wherein the first payload type is equal to 0, 1, 130 or 203, wherein the SEI message of the second payload type corresponds to any of a buffering period (BP) SEI message, a picture timing (PT) SEI message, a decoding unit information (DUI) SEI message, and a subpicture level information (SLI) SEI message, wherein the second payload type is not equal to any of 0, 1, 130 and 203, wherein the scalable-nested SEI message of the third payload type corresponds to a buffering period (BP) SEI message, a picture timing (PT) SEI message, a decoding unit information (DUI) SEI message, or a subpicture level information (SLI) SEI message, wherein the third payload type is equal to 0, 1, 130 or 203, wherein the scalable-nested SEI message of the fourth payload type corresponds to any of a buffering period (BP) SEI message, a picture timing (PT) SEI message, a decoding unit information (DUI) SEI message, a subpicture level information (SLI) SEI message, and a scalable nesting SEI message, wherein the fourth payload type is not equal to any of 0, 1, 130, 203, and 133, wherein the third payload type is not the same as the fourth payload type, wherein the rule further specifies that, when an SEI NAL unit contains an SEI message with a payload type of filler payload, the SEI NAL unit is disallowed to contain any other SEI message with a payload type not equal to filler payload, and wherein the rule further specifies that, an SEI message that has a payload type of filler payload is disallowed to be contained in a scalable nesting SEI message.

* * * * *